(12) United States Patent
Morifuji et al.

(10) Patent No.: US 10,373,344 B2
(45) Date of Patent: Aug. 6, 2019

(54) IMAGE PROCESSING APPARATUS AND METHOD FOR ADJUSTING INTENSITY OF A REFLECTIVE PROPERTY OF AN OBJECT IN A DISPLAYED IMAGE

(71) Applicant: SONY CORPORATION, Tokyo (JP)

(72) Inventors: Takafumi Morifuji, Tokyo (JP); Tomonori Tsutsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 74 days.

(21) Appl. No.: 15/304,549

(22) PCT Filed: Apr. 13, 2015

(86) PCT No.: PCT/JP2015/061309
§ 371 (c)(1),
(2) Date: Oct. 17, 2016

(87) PCT Pub. No.: WO2015/163169
PCT Pub. Date: Oct. 29, 2015

(65) Prior Publication Data
US 2017/0039732 A1    Feb. 9, 2017

(30) Foreign Application Priority Data

Apr. 23, 2014    (JP) ................................ 2014-088805

(51) Int. Cl.
*G06T 11/00* (2006.01)
*H04N 1/407* (2006.01)
(Continued)

(52) U.S. Cl.
CPC ............ *G06T 11/001* (2013.01); *G06F 3/012* (2013.01); *G06F 3/013* (2013.01); *G06F 3/016* (2013.01);
(Continued)

(58) Field of Classification Search
CPC ....... G06T 11/001; G06T 15/04; G06T 15/50; G06T 19/20; G06T 2215/16;
(Continued)

(56) References Cited

U.S. PATENT DOCUMENTS

2007/0217682 A1    9/2007 Motomura et al.
2009/0021513 A1*   1/2009 Joshi ................. G06T 15/005
                                                    345/419
(Continued)

FOREIGN PATENT DOCUMENTS

JP    2001-256510 A    9/2001
JP    2005-092549 A    4/2005
(Continued)

*Primary Examiner* — Maurice L. McDowell, Jr.
(74) *Attorney, Agent, or Firm* — Chip Law Group

(57) ABSTRACT

The present disclosure relates to an image processing apparatus and method capable of reproducing texture as if objects are actually present. An operation environment information analysis unit acquires and analyzes user's operation environment information for an image while the image is being displayed. The operation environment information analysis unit supplies the analyzed operation environment information as operation environment parameters to a property control unit. The property control unit causes an image combination unit to conduct texture control depending on visual environment parameters or operation environment parameters, thereby optimizing the texture control. The present disclosure is applicable to image processing apparatuses, for example.

15 Claims, 21 Drawing Sheets

(51) Int. Cl.
  *G06F 3/01*    (2006.01)
  *G06T 15/04*   (2011.01)
  *G06T 15/50*   (2011.01)
  *G06T 19/20*   (2011.01)
  *G06F 3/0488*  (2013.01)

(52) U.S. Cl.
  CPC .......... *G06F 3/017* (2013.01); *G06F 3/04883* (2013.01); *G06T 15/04* (2013.01); *G06T 15/50* (2013.01); *G06T 19/20* (2013.01); *H04N 1/407* (2013.01); *G06T 2215/16* (2013.01); *G06T 2219/2012* (2013.01); *G06T 2219/2024* (2013.01)

(58) Field of Classification Search
  CPC ..... G06T 2219/2012; G06T 2219/2024; G06F 3/04883; G06F 3/012; G06F 3/016; G06F 3/013; G06F 3/017; H04N 1/407
  See application file for complete search history.

(56) References Cited

U.S. PATENT DOCUMENTS

| | | | | |
|---|---|---|---|---|
| 2011/0206237 | A1* | 8/2011 | Saruta | G06K 9/4661 |
| | | | | 382/103 |
| 2012/0194433 | A1* | 8/2012 | Imai | H04N 13/0468 |
| | | | | 345/158 |
| 2015/0294511 | A1* | 10/2015 | Nishioka | G06T 15/06 |
| | | | | 345/420 |

FOREIGN PATENT DOCUMENTS

| | | |
|---|---|---|
| JP | 2006-004197 A | 1/2006 |
| JP | 2010-205120 A | 9/2010 |
| JP | 2012-113600 A | 6/2012 |
| WO | 2010/087162 A | 8/2010 |
| WO | 2010/087162 A1 | 8/2010 |
| WO | 2012/001949 A | 1/2012 |
| WO | 2012/001949 A1 | 1/2012 |

\* cited by examiner

FIG. 10
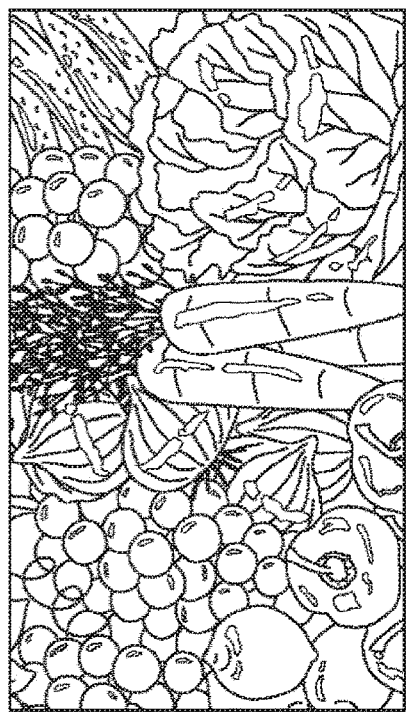
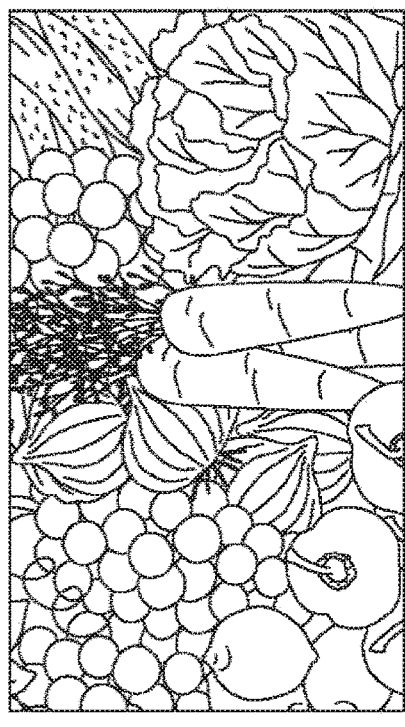
SPECULAR REFLECTANCE : IMAGE AT 0.X TIMES

FIG. 13

| | USER OPERATION INFORMATION | | | IMAGE | IMAGE CONTROL | | | ENVIRONMENT CONTROL | PURPOSE |
|---|---|---|---|---|---|---|---|---|---|
| | OPERATION | EYES | DISPLAY | LIGHT SOURCE ESTIMATION | VIEWPOINT | REFLECTION | GEOMETRY | ADJUSTMENT | |
| EX 1 | ○ (FLICK) | | | | ○ | ◎ | | | WEIGHT, MATERIAL |
| EX 2 | ○ (POSITION) | ○ (ORIENTATION) | | | | ◎ | | | TEXTURE |
| EX 3 | ○ (POSITION) | ○ (ORIENTATION) | | | | | ◎ | | TOUCH |
| EX 4 | | ○ (BLINK) | ○ (TILT) | | | ◎ | ◎ | | TEXTURE/TOUCH |
| EX 5 | | | | | | ◎ | | ○ | NATURAL FEELING |
| EX 6 | | | ○ (VIEWING TIME) | | | ◎ | | ○ | NATURAL FEELING (LOW POWER) |
| EX 7 | | | | ○ (COLOR, POSITION) | | | | ○ | TEXTURE |

IMAGE PROCESSING APPARATUS AND METHOD FOR ADJUSTING INTENSITY OF A REFLECTIVE PROPERTY OF AN OBJECT IN A DISPLAYED IMAGE

CROSS REFERENCE TO RELATED APPLICATIONS

This application is a U.S. National Phase of International Patent Application No. PCT/JP2015/061309 filed on Apr. 13, 2015, which claims priority benefit of Japanese Patent Application No. JP 2014-088805 filed in the Japan Patent Office on Apr. 23, 2014. Each of the above-referenced applications is hereby incorporated herein by reference in its entirety.

TECHNICAL FIELD

The present disclosure relates to an image processing apparatus and method, and particularly to an image processing apparatus and method capable of reproducing texture as if objects are actually present.

BACKGROUND ART

There have been developed techniques for adjusting contrast or subtlety in order to enhance reality of videos.

Note that there is proposed a technique for realizing color correction or desired color reproduction of objects in an image thereby to achieve high image quality in Patent Document 1.

CITATION LIST

Patent Document

Patent Document 1: International Publication No. 2010/087162

SUMMARY OF THE INVENTION

Problems to be Solved by the Invention

However, the performance remains limited even with enhancement in basic image quality such as contrast or subtlety. Thus, texture is desired to reproduce as if objects are actually present, or a situation is reproduced in video as if objects are actually seen, for example.

The present disclosure has been made in terms of the situation, and enables to reproduce texture as if objects are actually present.

An image processing apparatus of an aspect of the present disclosure includes: a user operation information acquisition unit for acquiring user operation information on user's operations performed while an image is being displayed; and a texture control unit for controlling texture of an object in the image depending on the user operation information acquired by the user operation information acquisition unit.

The user operation information is user's operation information input for a displayed image.

The user operation information is user's eyes information for a displayed image.

The user operation information is tilt information when the user moves a display displaying the image thereon.

The user operation information is viewing information on viewing of the user viewing a displayed image.

The texture control unit can adjust intensity of a reflective property of the object in the image.

The texture control unit can change a viewpoint position of the object in the image.

The texture control unit can change a geometry of the object in the image.

The image processing apparatus can further include: an additional information generation unit for generating additional information for adjusting a viewing environment in which a displayed image is viewed depending on control contents of the texture control unit.

The additional information is directed for adjusting a viewing environment light.

The image processing apparatus can further include: a physical property parameter acquisition unit for acquiring physical property parameters of an object in an image, and the texture control unit can control texture of the object in the image depending on the physical property parameters acquired by the physical property parameter acquisition unit.

The physical property parameters are reflective property information on a reflective property of the object.

The physical property parameters are information on materials of the object.

The physical property parameters are information on a geometry of the object.

The physical property parameters are information on lighting of the object.

In an image processing method of an aspect of the present disclosure, an image processing apparatus acquires user operation information on user's operations performed while an image is being displayed, and controls texture of an object in the image depending on the acquired user operation information.

According to an aspect of the present disclosure, user operation information on user's operations while an image is being displayed is acquired. Then, texture of objects in the image is controlled depending on the acquired user operation information.

Effects of the Invention

According to an aspect of the present disclosure, an image can be processed. In particular, texture can be reproduced as if objects are actually present. Note that the effects described in the present specification are merely exemplary, and the effects of the present technology are not limited to the effects described in the present specification, and additional effects may be produced.

BRIEF DESCRIPTION OF DRAWINGS

FIG. 10 is a diagram for explaining a fifth embodiment of the present technology.

FIG. 13 is a diagram illustrating a table summarizing the embodiments therein.

MODE FOR CARRYING OUT THE INVENTION

The modes for carrying out the present disclosure (which will be denoted as embodiments below) will be described below. Note that the description will be made in the following order.
1. Outline of present technology
2. Exemplary structures
3. Embodiments
4. Exemplary processing
5. Exemplary structure of computer <1. Outline of Present Technology>
[Concept of Present Technology]

Figure 1:
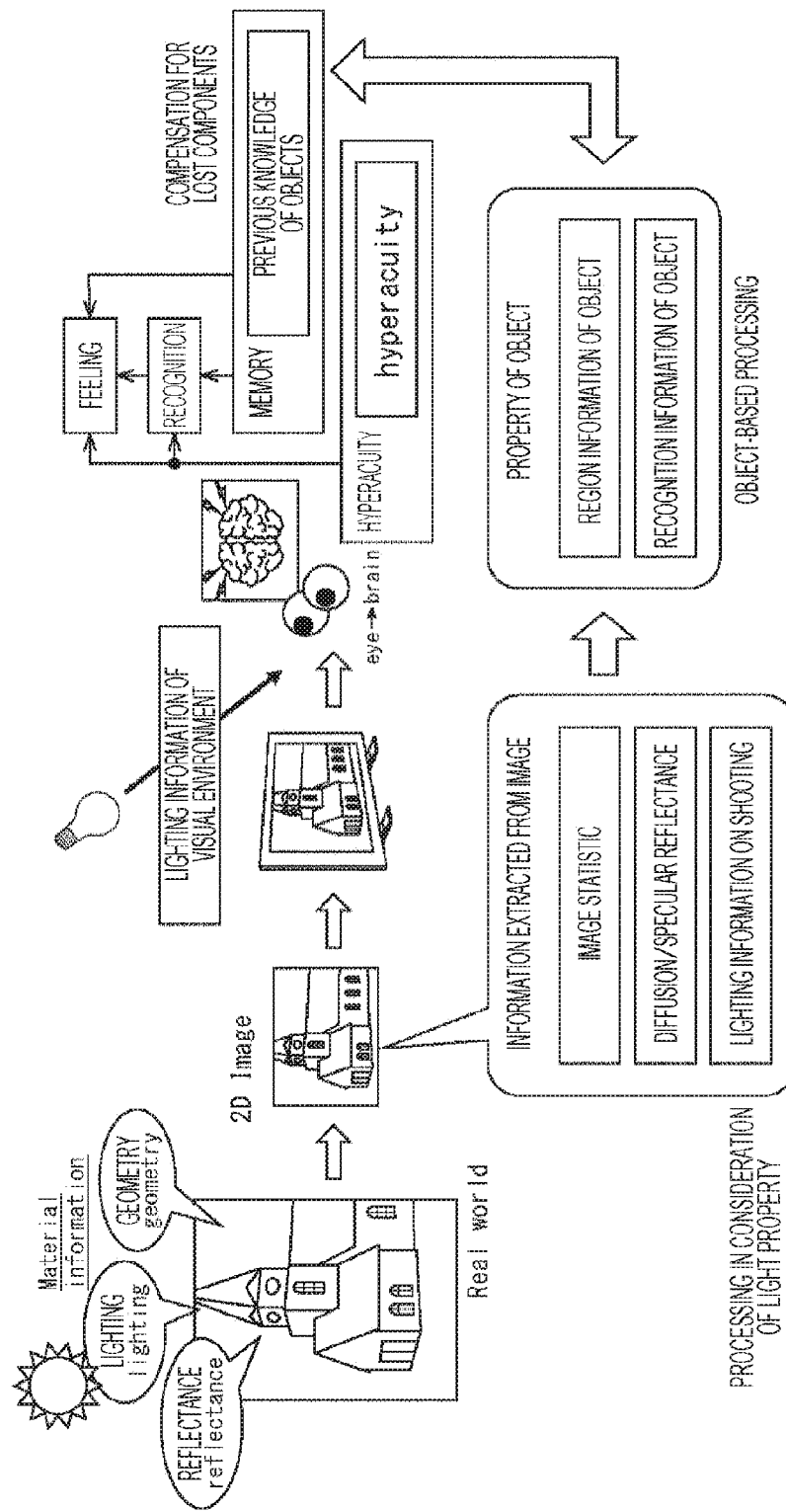
FIG. 1 is a diagram for explaining a concept of the present technology.

A concept of the present technology will be described with reference to FIG. 1. The present technology is directed for enhancing texture of objects in an image.

Material information on what human's eyes feel or how light comes into eyes in the real world is essential information. The material information is sunlight (lighting), geometry of objects, reflectance of objects, and the like, for example, and light can be reproduced in theory with the material information.

The material information comes into a sensor of a camera thereby to estimate and obtain object property information (region information or recognition information of object) based on the information extracted from an image (2DImage) (image statistic, diffusion/specular reflectance, and lighting information on shooting).

Note that the processing of extracting information from an image is a processing considering light property, and the processing of estimating the extracted information as object property information is an object-based processing.

Therefore, in the present technology, the information extracted from an image is used as object property information thereby to control texture of (the surfaces of) the objects in the image. Further, material information measured and acquired from the real world can be used for the control.

Further, the texture of the objects in the image is associated with not only the material information but also information on his/her seeing environment (lighting information of visual environment) and information (hyperacuity) on how a person feels. Therefore, in the present technology, the texture of objects in the image is controlled and the image is re-created by use of not only the material information but also the information on his/her seeing environment (lighting information of visual environment) and the information on how a person feels.

In this way, the texture of the objects in the image can be controlled in the present technology. Herein, in the present specification, the texture indicates human psychological feeling (psychological factor) relative to material nature (physical factor).

That is, in the present specification, the texture is defined to have parameters indicating physical properties of objects as physical factors and parameters indicating recognition sensitivity of object as psychological factors.

Therefore, texture control in the present specification indicates to control the parameters of physical factors and psychological factors. Note that it will be only described below that physical property parameters as parameters of physical factors are controlled in texture control, but actually the parameters indicating object recognition sensitivity as the parameters of psychological factors are also controlled.

Further, in the present technology, the user operation information, eyes information, viewing information, and the like while an image is being displayed are acquired and analyzed on texture control, and are used for the texture control. Thereby, the texture of objects can be more realistically reproduced in the image. For example, the feelings other than appearance, such as touch of objects, can be given.

Further, in the present technology, the information used for texture control is fed back to the user's visual environment or operation environment, and consequently the texture is more controlled. Thereby, more realistic video expression is enabled.

Note that the user's operation information, eyes information, and viewing information while an image is being displayed are operation information on user's operations while the image is being displayed, and thus the items of information will be collectively denoted as user operation information.

[Texture Control Method of Present Technology]

A texture control method according to the present technology will be described below with reference to FIG. 2.

At first, an object in the real world is shot and an image of the object is input into a measurement/estimation block 1. The physical property parameters indicating the physical property of the object are measured and acquired from the real world in the measurement/estimation block 1 when the object is shot. Alternatively, the physical property parameters indicating the physical property of the object are estimated and acquired from the input image of the object in the measurement/estimation block 1. For example, the physical property parameters such as lighting, object structure and reflective property are acquired.

The acquired physical property parameters of the object are modeled in a real-world modeling block 2. The modelled physical property parameters of the object are input into a texture control block 3.

In the texture control block 3, texture of the object in the image is controlled depending on the modeled physical property parameters of the object or the feature (texture) acquired from the image. As exemplary texture control, a physical property parameter is changed for easy reflection, for example. Thereby, an optical property of the object is optimized. Further, for example, a part with less texture is appropriately recovered. That is, in the texture control block 3, the physical property parameters are changed (controlled) as texture control for enhancing apparent glossiness or transparency.

Further, in the texture control block 3, the user operation information (such as operation information, eyes information, and viewing information) on user's operations performed while the image is being displayed is acquired and analyzed to be used for the texture control. Further, the information used for the texture control is fed back to and reflected on the visual environment or operation environment, and consequently the texture is more controlled in the texture control block 3.

In a rendering/retouching block 4, the image is recombined (rendered) in order to reconstruct the image depending on the texture-controlled result (changed parameters), and an image with finely-adjusted image quality is output.

With the above processing, according to the present technology, optimization of illumination light, enhancement in glossiness, and reproduction of transparency are achieved in the image, for example, when the input image is different from actual appearance. That is, a situation when the object is actually seen can be reproduced in a video.

Further, according to the present technology, image quality or display method is changed depending on the user operation information (user interaction), thereby providing feelings other than appearance, such as touch of objects.

Furthermore, according to the present technology, the texture control information (contents) is fed back as additional information to the visual environment or the operation environment during user's operation. Thereby, more realistic video expression is enabled.

<2. Exemplary Structures>

[Exemplary Structures of Image Processing Apparatus]

Figure 3:
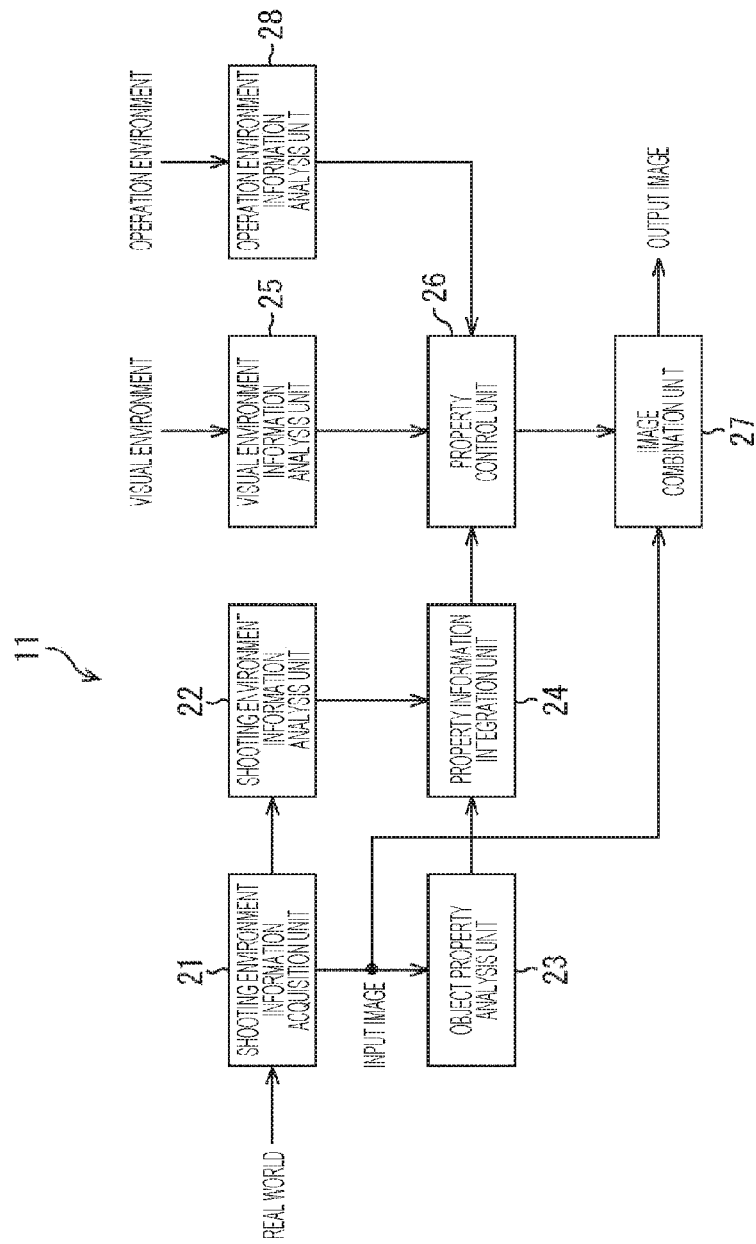
FIG. 3 is a block diagram illustrating an exemplary main structure of an image processing apparatus.

FIG. 3 is a block diagram illustrating a structure of an embodiment of an image processing apparatus to which the present disclosure is applied.

In an image processing apparatus 11 illustrated in FIG. 3, as described above, an object in the real world is shot, and the physical property parameters of the object in an input image are acquired thereby to obtain user (viewer) operation information. Then, texture of the object in the image is controlled depending on the physical property parameters or the operation information thereby to output an image with the controlled texture of the object.

The image processing apparatus 11 includes a shooting environment information acquisition unit 21, a shooting environment information analysis unit 22, an object property analysis unit 23, a property information integration unit 24, a visual environment information analysis unit 25, a property control unit 26, an image combination unit 27, and an operation environment information analysis unit 28.

Figure 2:
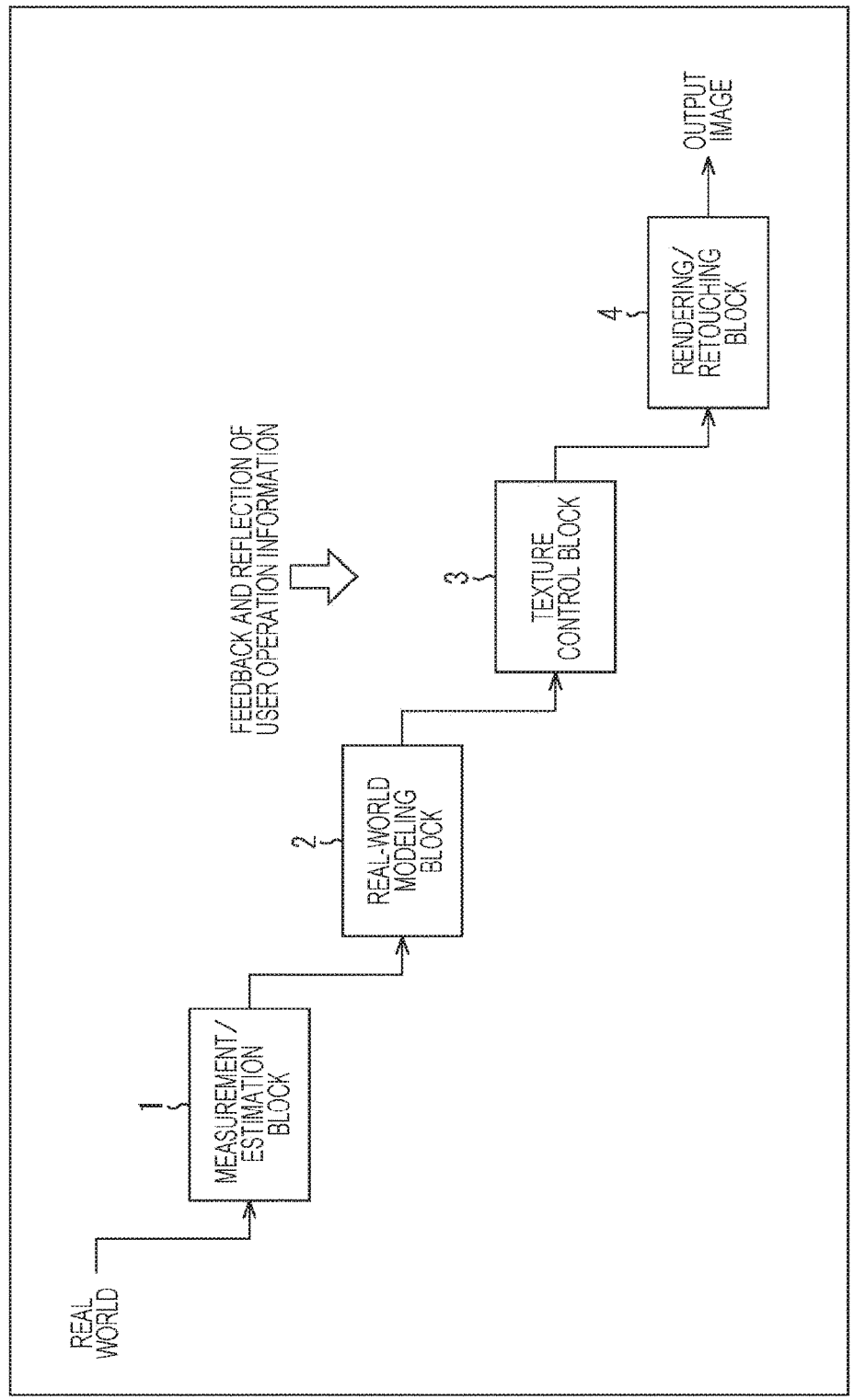
FIG. 2 is a diagram for explaining a texture control method of the present technology.

The shooting environment information acquisition unit 21, the shooting environment information analysis unit 22, and the object property analysis unit 23 correspond to the measurement/estimation block 1 in FIG. 2. The property information integration unit 24 corresponds to the real-world modeling block 2 in FIG. 2. The property control unit 26 corresponds to the texture control block 3 in FIG. 2. The image combination unit 27 corresponds to the rendering/retouching block 4.

The shooting environment information acquisition unit 21 shoots an image of an object, inputs the image of the object, and supplies the input image to the object property analysis unit 23 and the image combination unit 27. Further, the shooting environment information acquisition unit 21 acquires shooting information on the environment or the object when shooting the image of the object, and supplies the acquired shooting information to the shooting environment information analysis unit 22.

The shooting environment information analysis unit 22 analyzes the shooting information acquired on the shooting from the shooting environment information acquisition unit 21, and supplies the analyzed shooting information to the property information integration unit 24.

The object property analysis unit 23 estimates and analyzes a property of the object based on the input image from the shooting environment information acquisition unit 21, and supplies the analyzed image estimation information to the property information integration unit 24. In the object property analysis unit 23, information on detailed (with a higher sampling rate, for example) parts, which cannot be acquired as shooting information on the shooting, can be estimated and acquired from the image.

The property information integration unit 24 integrates the shooting information from the shooting environment information analysis unit 22 and the image estimation information from the object property analysis unit 23, and supplies the integrated information as physical property parameters of the object to the property control unit 26.

The visual environment information analysis unit 25 acquires and analyzes information on visual environment when the image is viewed. The visual environment information analysis unit 25 supplies the analyzed visual environment information as visual environment parameters to the property control unit 26.

The property control unit 26 uses, as the control parameters, the physical property parameters of the object from the property information integration unit 24, the visual environment parameters from the visual environment information analysis unit 25, and the operation environment parameters from the operation environment information analysis unit 28. Specifically, for example, the property control unit 26 determines the processing contents for controlling texture by changing image quality, adjusting reflective property, or changing geometry on the basis of the physical property parameters from the property information integration unit 24. The property control unit 26 supplies the information on the determined processing contents to the image combination unit 27 thereby to cause the image combination unit 27 to conduct texture control. Further, the property control unit 26 causes the image combination unit 27 to conduct texture control depending on the visual environment parameters or the operation environment parameters, thereby optimizing the texture control.

The image combination unit 27 recombines (renders) and adjusts the input image from the shooting environment information acquisition unit 21, and outputs the recombination result as output image under control of the property control unit 26.

The operation environment information analysis unit 28 acquires and analyzes the user's operation environment information for the image, which is performed while the image is being displayed.

Note that the operation environment information may be viewer's eyes information, operation information using an operation unit such as touch panel or mouse, sensor information given to the display, and user's viewing time information. Examples of the viewer's eyes information are information on position or size of regions of interest, information on the number of blinking, and the like. Examples of the operation information are information on touch position, pointer position, width of flick, how to move the arms by gesture recognition, and the like. The sensor information may be information on tilt of the display or speed of its movement.

The operation environment information analysis unit 28 supplies the analyzed operation environment information as operation environment parameters to the property control unit 26.

Note that the control parameters are configured of the physical property parameters of the object in which the shooting information from the shooting environment information analysis unit 22 and the image estimation information from the object property analysis unit 23 are integrated, and the visual environment parameters from the visual environment information analysis unit 25.

The physical property parameters of the object include information on depth and geometry of the object, lighting information during shooting, material information of the object, and reflective property information of the object. Note that the lighting information during shooting influences the color of the object, and may be information on the object or the background of the object, and is included in the physical property parameters of the object.

The visual environment parameters include visual environment light information.

[Other Exemplary Structure of Image Processing Apparatus]

Figure 4:
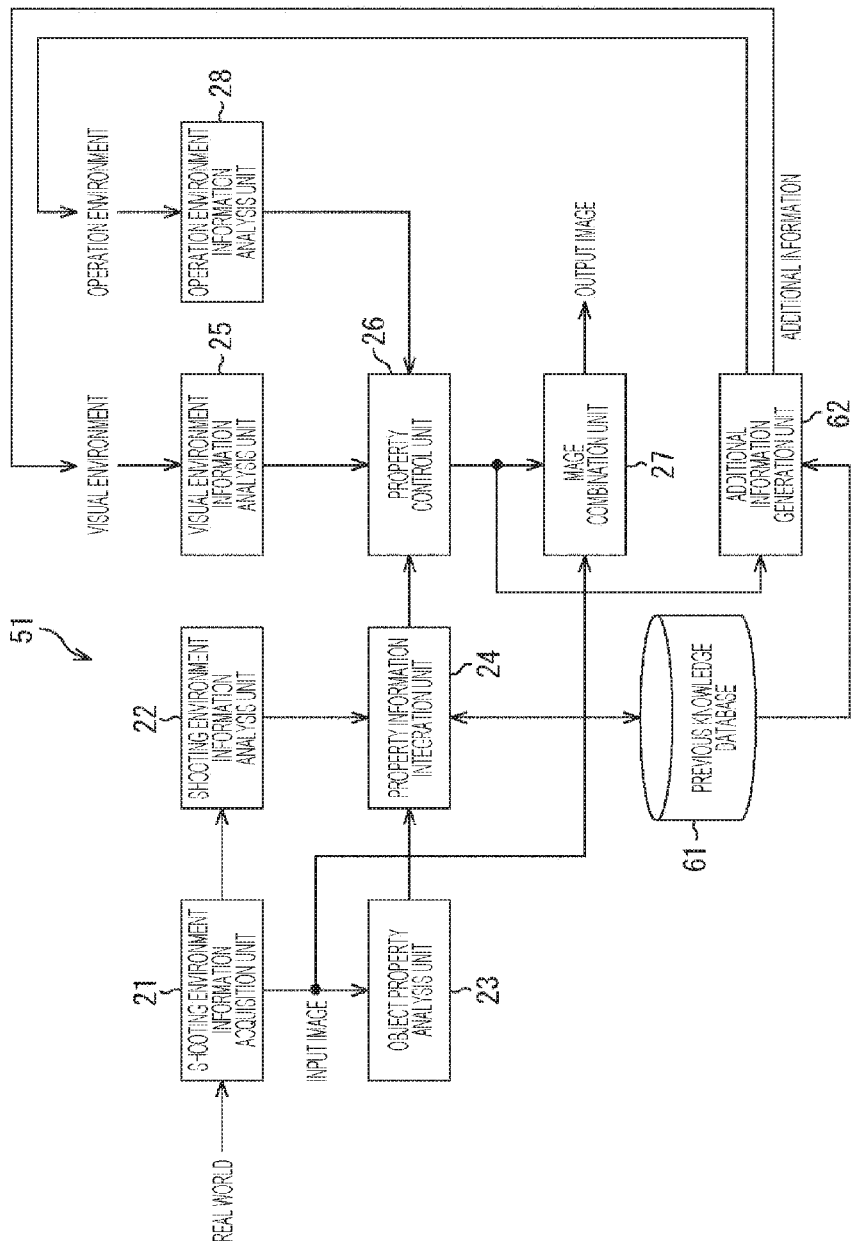
FIG. 4 is a block diagram illustrating other exemplary structure of the image processing apparatus.

FIG. 4 illustrates a structure of other embodiments of the image processing apparatus to which the present disclosure is applied. The example of FIG. 4 illustrates the structure of the image processing apparatus in which material information of an object is also acquired as property of the object and the acquired material information is used for texture control. Further, in the example of FIG. 4, texture recovery is also performed as texture control. In the example, the fact that different materials have their own reflective property is used.

An image processing apparatus 51 illustrated in FIG. 4 is common with the image processing apparatus 11 in FIG. 3 in that it includes the shooting environment information acquisition unit 21, the shooting environment information analysis unit 22, the object property analysis unit 23, the property information integration unit 24, the visual environment information analysis unit 25, the property control unit 26, the image combination unit 27, and the operation environment information analysis unit 28.

The image processing apparatus 51 is different from the image processing apparatus 11 in FIG. 3 in that it is added with a previous knowledge database 61 and an additional information generation unit 62.

That is, the shooting environment information analysis unit 22 supplies the analyzed shooting information (including the object material information) to the property information integration unit 24. The object property analysis unit 23 supplies the analyzed object property (image estimation information) to the property information integration unit 24.

The property information integration unit 24 integrates the shooting information from the shooting environment information analysis unit 22 and the image estimation information from the object property analysis unit 23 on the basis of reliability, and supplies the integrated information as physical property parameters of the object to the property control unit 26. Further, the property information integration unit 24 reads a texture image corresponding to the material (such as skin, metal, or cloth) of the object from the previous knowledge database 61 and supplies the read texture image to the property control unit 26 under control of the property control unit 26.

The property control unit 26 determines the processing contents for controlling texture on the basis of the physical property parameters from the property information integration unit 24. Specifically, the property control unit 26 determines, as the physical property parameters, the processing contents for texture control of adjusting the diffusion reflectance in consideration of the specular reflectance or the entire balance on the basis of the reflective property of the material of the object, for example. Then, the property control unit 26 then causes the image combination unit 27 to conduct the determined texture control.

The property control unit 26 causes the image combination unit 27 to conduct texture control depending on the visual environment parameters from the visual environment information analysis unit 25, thereby optimizing the texture control. Specifically, the property control unit 26 determines the processing contents for texture control of adjusting contrast depending on an illumination light (visual environment light) on the viewing, for example, as the visual environment parameters, and causes the image combination unit 27 to conduct the determined texture control.

Further, the property control unit 26 determines the processing contents for texture control of causing the property information integration unit 24 to read a texture image depending on a material and using it to perform the texture recovery processing depending on the kind of the material of the input image, and causes the image combination unit 27 to conduct the determined texture control.

The previous knowledge database 61 holds materials of objects, material information of jewelry, metal part, water, leather, and the like, size, hardness, texture image, and the like. For example, the previous knowledge database 61 is referred to with a material of the object recognized from the image as a key.

Note that, in the example of FIG. 4, the texture control information from the property control unit 26 to the image combination unit 27 is also supplied to the additional information generation unit 62.

The additional information generation unit 62 generates additional information for controlling the visual environment or the operation environment in order to feed back the texture control information to the visual environment or the operation environment on the basis of the texture control information form the property control unit 26 and the texture image or the like from the previous knowledge database 61. The additional information generation unit 62 provides (feeds back) the generated additional information to a lighting instrument configuring the visual environment, a detection unit for detecting the eyes information, the operation unit, or the GUI, which are configuring the operation environment.

Figure 5:
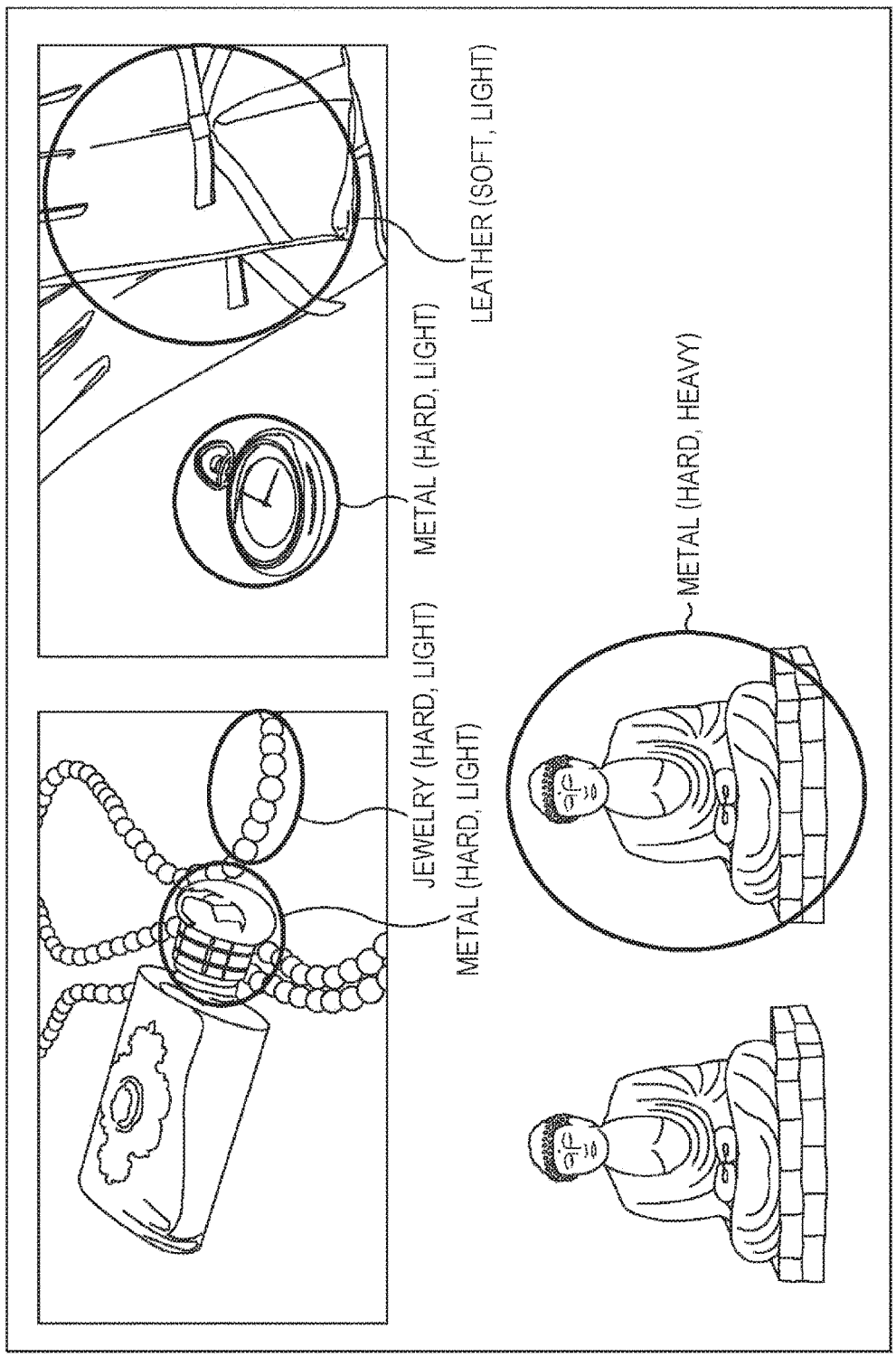
FIG. 5 is a diagram illustrating exemplary information in a previous knowledge database.

FIG. 5 is a diagram illustrating exemplary information held in the previous knowledge database 61.

For example, a cosmetic bottle and a pearl necklace (jewelry) are shot in the upper left image in the figure. The material of the cap of the cosmetic bottle is metal, and is held as information of being hard and light in the previous knowledge database 61. The material of the jewelry is jewelry, and is held as information of being hard and wide in the previous knowledge database 61. For example, a fob watch and a pair of leather gloves are shot in the right image in the figure. The material of the fob watch is metal and the material of the gloves is leather, which are held as information of being hard and light and information of being soft and light in the previous knowledge database 61, respectively. For example, a Buddha statue is shot in the lower left image. The material of the Buddha statue is metal, and is held as information of being hard and heavy in the previous knowledge database 61.

<3. Embodiments>

Figure 6:
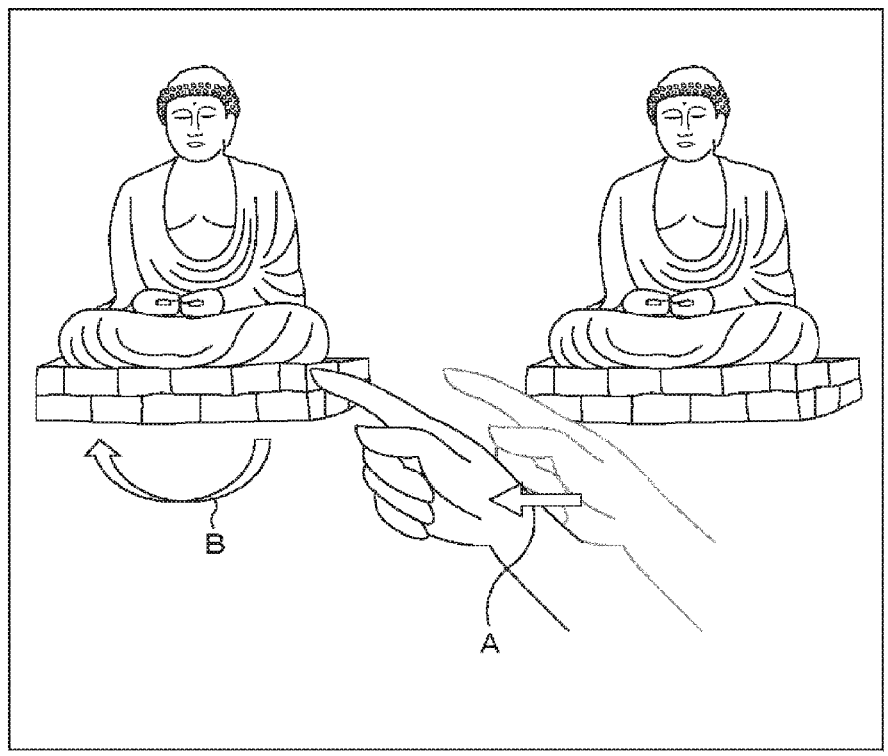
FIG. 6 is a diagram for explaining a first embodiment of the present technology.

An example in which a viewpoint generation position is changed depending on a direction of flick on a touch panel will be first described according to a first embodiment with reference to FIG. 6.

For example, the user flicks the position of the Buddha statue displayed on a touch panel as indicated in the arrow A. At this time, the operation environment information analysis unit 28 acquires the flick on the touch panel as the user operation information, and then supplies the acquired flick information as the operation environment parameters to the property control unit 26.

On the other hand, the material of the object is analyzed as metal based on the input image in the object property analysis unit 23, and is supplied to the property information integration unit 24. In the property information integration unit 24, the previous knowledge database 61 is searched with metal (Buddha statue) as a key, the information of being heavy hits, and the information that the material of the object is metal (Buddha statue) and heavy is supplied to the property control unit 26.

In the property control unit 26, when the material of the object is heavy metal like the Buddha statue illustrated in FIG. 6 as a result of the property analysis, texture control of reducing a change in viewpoint position thereby to express the weight is conducted. Further, the property control unit 26 changes a generation viewpoint position and a controlled specular reflectance (such as emphasis) depending on the viewpoint position. Thereby, the Buddha statue is rotated while its viewpoint is being changed, and the weight and the material of the Buddha statue can be more realistically expressed by its rotation speed.

Note that, at this time, a speed to change the image can be slower for the heavier objects or the harder objects depending on a change in flick speed.

An example in which a specular reflectance is emphasized only for a region of interest by eyes detection or a region designated by touch position will be described below according to a second embodiment with reference to FIG. 7.

For example, the user touches a vegetable (paprika) in the lower left image on his/her viewing display so that a region P is designated. At this time, the operation environment information analysis unit 28 acquires the region P as the user operation information, and supplies the acquired information on the region P as the operation environment parameters to the property control unit 26.

The property control unit 26 controls texture to emphasize the specular reflectance only in the region P. Thereby, the specular reflection is emphasized only in the designated region. Thereby, the texture of the vegetable is more realistically expressed.

Figure 7:
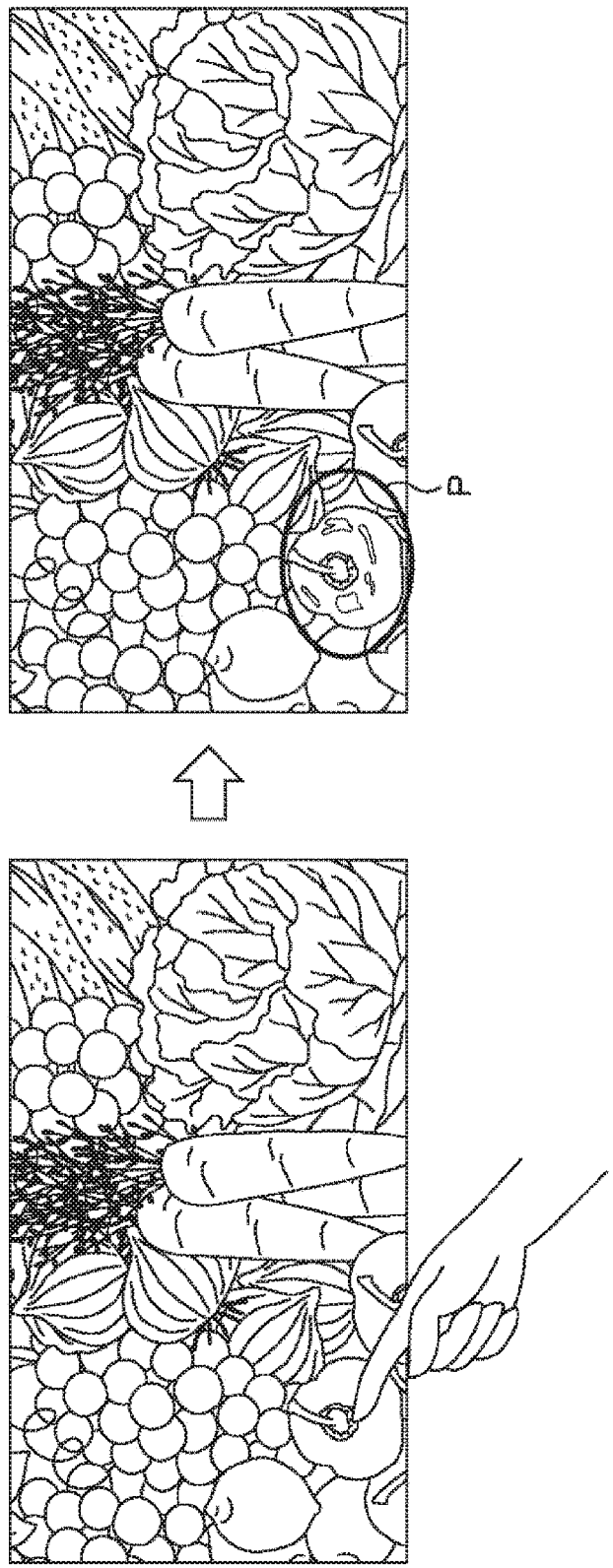
FIG. 7 is a diagram for explaining a second embodiment of the present technology.

Note that an exemplary designated region is illustrated in the example of FIG. 7, but an orientation of eyes is detected thereby to control texture such that the specular reflectance is emphasized only in the region of interest by the eyes detection.

An example in which a geometry is changed only in a region of interest by eyes detection or a region designated by touch position will be described below according to a third embodiment with reference to FIG. 8.

For example, the user touches a vegetable (paprika) in the lower left image so that a region Q is designated. At this time, the operation environment information analysis unit 28 acquires the region Q as the user operation information, and supplies the acquired information on the region Q as the operation environment parameters to the property control unit 26.

The property control unit 26 controls texture such that the geometry is changed only in the region Q (simply processed to be concaved). Thereby, a pseudo feeling of touch can be expressed.

That is, in the object property analysis unit 23, the material of the object is analyzed to be metal based on the input image, and is supplied to the property information integration unit 24. In the property information integration unit 24, the previous knowledge database 61 is searched with metal as a key, the information of being hard hits, and the information that the material of the object is metal and hard is supplied to the property control unit 26.

Then, when the material of the object is metal and hard as a result of the property analysis, the property control unit 26 then controls texture to express the hardness by reducing a change in geometry. Note that the geometry may be or may not be returned to the origin. For example, a geometry in sand beach is changed and then the geometry may not be returned to the origin, and in the case of liquid, a geometry of liquid is changed and then may be returned to the origin.

Further, for example, a speed to change the image can be slower for the heavier objects or the harder objects depending on a change in tilt of the display.

Figure 8:
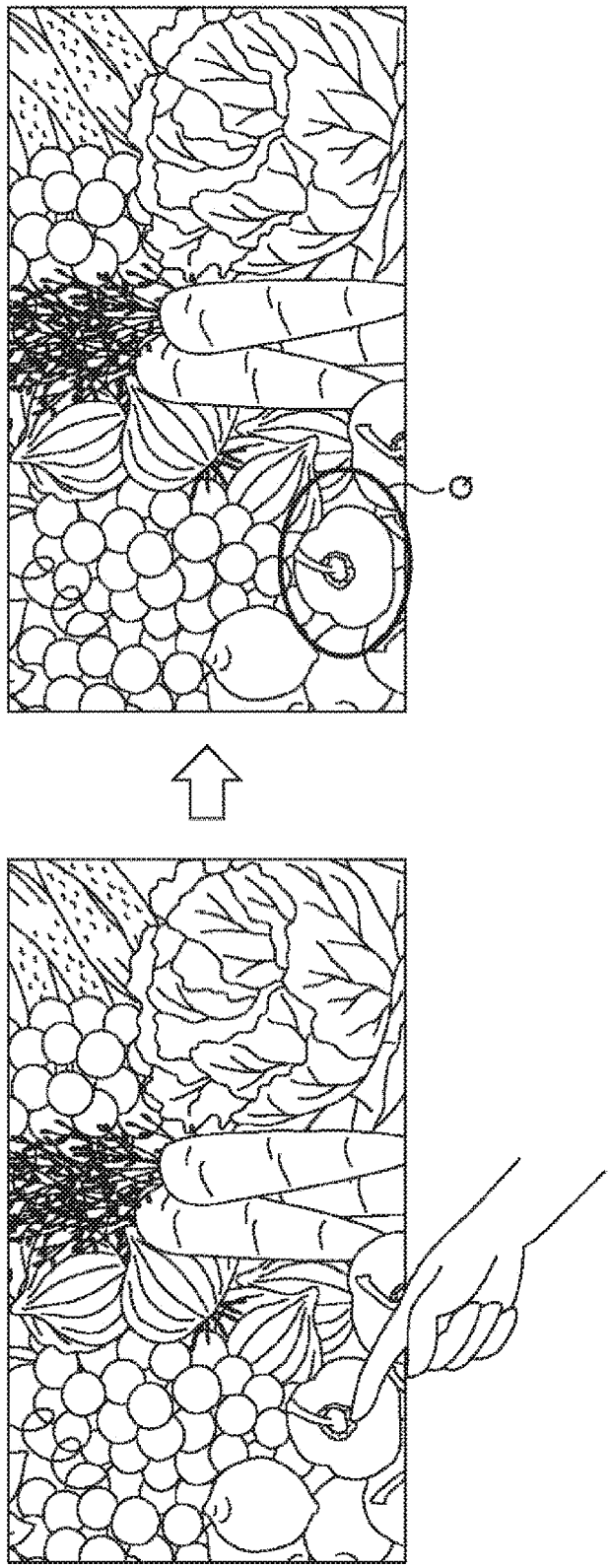
FIG. 8 is a diagram for explaining a third embodiment of the present technology.

Note that an exemplary designated region is illustrated also in the example of FIG. 8, but an orientation of eyes is detected thereby to control texture such that the specular reflectance is emphasized only in a region of interest by the eyes detection.

Figure 9:
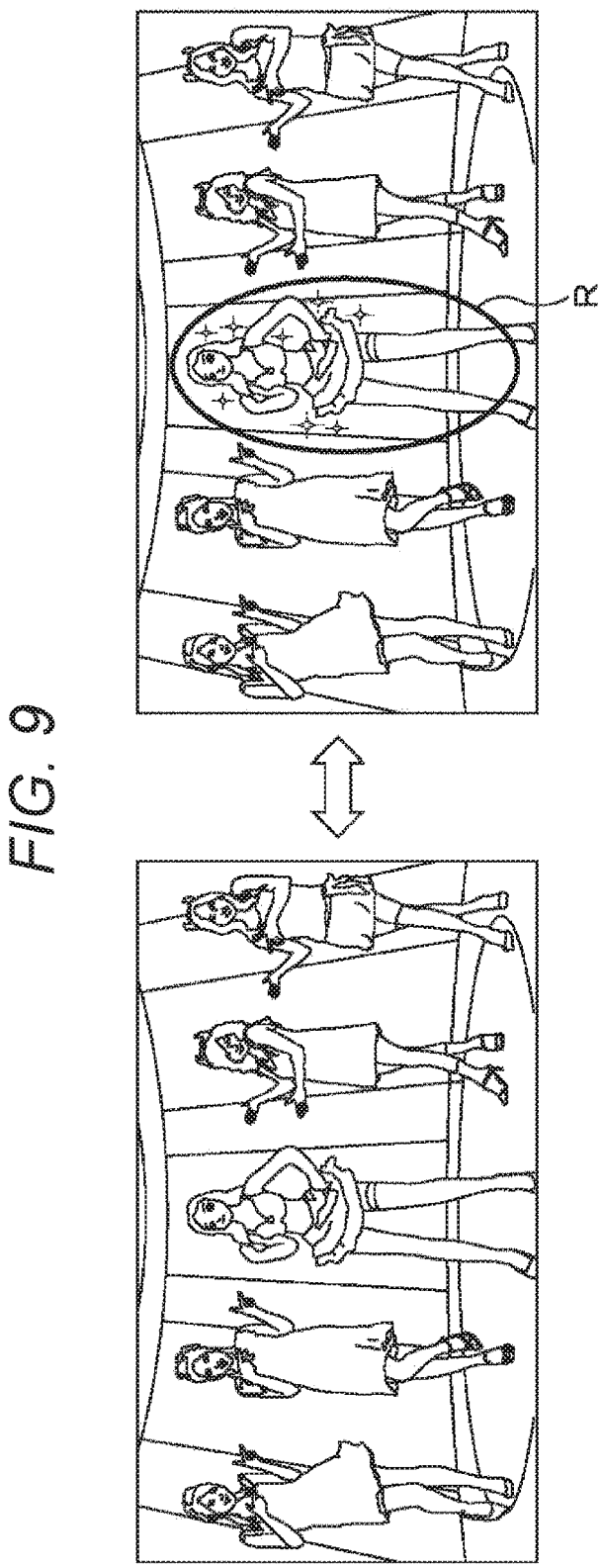
FIG. 9 is a diagram for explaining a fourth embodiment of the present technology.

An example in which the emphasized specular reflectance is changed depending on a tilt of the user-moving display device will be described below according to a fourth embodiment with reference to FIG. 9.

For example, the user moves a display device such as tablet or multi-functional cell phone. At this time, the operation environment information analysis unit 28 acquires the tilt information of the display device from the sensor or the like attached on the display device, and supplies the acquired tilt information as the operation environment parameters to the property control unit 26.

The property control unit 26 controls texture such that the emphasized specular reflectance is changed depending on a tilt as illustrate in a region R, for example. Thereby, even a still image can look sparkling like animation, and texture or touch can be more realistically reproduced.

Note that a geometry of pudding or the like may be changed depending on a tilt, for example. Further, this example can be applied to a head-mount display with head tracking.

An example in which the specular reflectance is restricted to reduce brightness when the user feels too bright will be described below according to a fifth embodiment with reference to FIG. 10.

For example, while the user is viewing an image, the operation environment information analysis unit 28 acquires the blinking of the user (viewer) detected by the eyes detection unit or the like, and supplies the acquired number of blinking and the like as the operation environment parameters to the property control unit 26.

The property control unit 26 determines whether the user feels too bright depending on a change in the number of blinking, and when determining that the user feels too bright by use of the determination result, controls texture to restrict the specular reflectance for reducing the brightness. For example, in FIG. 10, the specular reflectance on the left side in the figure is too high, and thus the texture is controlled to be an image with the specular reflectance of 0.× times as illustrated on the right side in the figure.

Note that the determination as to brightness can be made by detecting a change in size of the dark eyes other than the number of blinking, and using it.

Further, in the example of FIG. 10, in the image processing apparatus 51 illustrated in FIG. 4, the contents of the texture control of restricting the specular reflectance are supplied to the additional information generation unit 62. The additional information generation unit 62 generates additional information based on the contents of the texture control, feeds back it to lighting for adjusting the visual environment thereby to adjust the environment light and to reduce brightness in the lighting configuring the visual environment.

An example in which a user's viewing time is monitored and the emphasized specular reflectance is gradually restricted in a long viewing time will be described below according to a sixth embodiment with reference to FIG. 11.

For example, the property control unit 26 monitors a user's viewing time based on the information by the eyes detection unit or the like and determines whether the viewing time exceeds a predetermined time α, and when the time α is exceeded, gradually lowers an emphasis gain of the specular reflectance. At the same time, the property control unit 26 determines whether a predetermined time β (β>α) is exceeded, and when the time β is exceeded, stops attenuation in the specular reflectance.

By doing so, the human visual property gradually adapts to brightness over time, thereby saving power consumption or reducing brightness without losing the effects.

Figure 11:
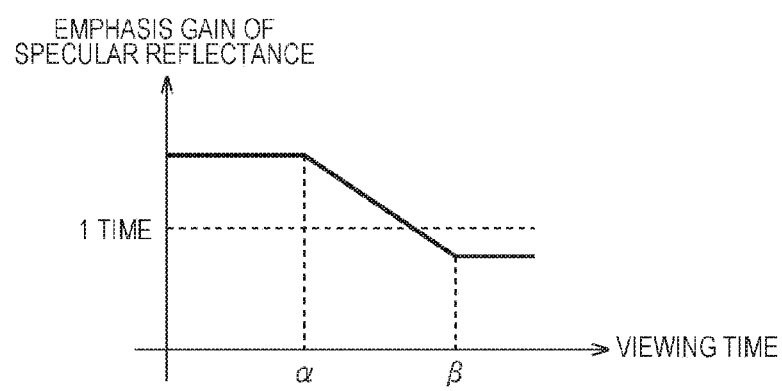
FIG. 11 is a diagram for explaining a sixth embodiment of the present technology.

Note that, also in the example of FIG. 11, in the image processing apparatus 51 illustrated in FIG. 4, the contents of the texture control of restricting the specular reflectance are supplied to the additional information generation unit 62. The additional information generation unit 62 generates additional information based on the contents of the texture control, and feeds back it to lighting for adjusting the visual environment thereby to adjust the environment light and to reduce brightness in the lighting or the like configuring the visual environment.

Figure 12:
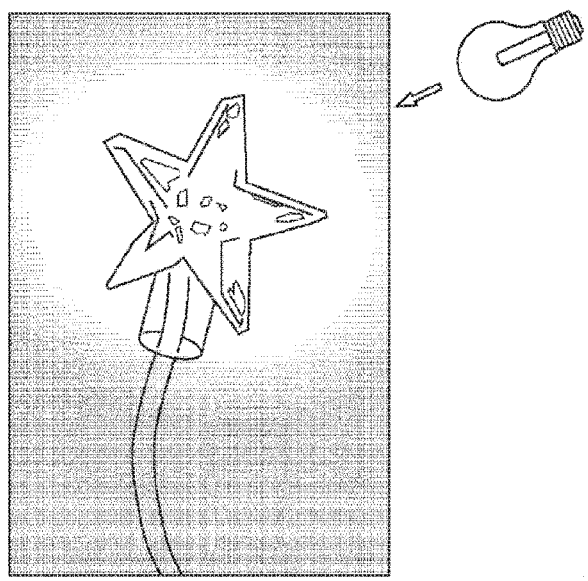
FIG. 12 is a diagram for explaining a seventh embodiment of the present technology.

An example in which an environment light is adjusted in order to produce more effects in addition to the above embodiments will be finally described according to a seventh embodiment with reference to FIG. 12. Note that this is performed by the image processing apparatus 51 in FIG. 4.

In the example of FIG. 12, an environment light configuring the visual environment is adjusted depending on a direction or color of a light source in an image. For example, a direction or color of a light source in an image is extracted from the image, the extracted information is analyzed, and a plurality of controllable lightings are arranged around the display depending on the direction or color of the light source in the image to generate additional information, thereby controlling color or intensity of the lights.

Note that, at this time, the image (may be corrected but) is not corrected, and thus the control contents are supplied to the additional information generation unit 62 by the property control unit 26. In the additional information generation unit 62, additional information is generated on the basis of the control contents and is transmitted to a plurality of controllable lightings in the visual environment, thereby adjusting a direction or color of the light sources in the image, which consequently enhances reproducibility of the image.

FIG. 13 is a table summarizing the first to seventh embodiments therein.

The description will be made from the top. For the first embodiment described with reference to FIG. 6, the touch panel is flicked as the user operation information, and image control for viewpoint position or specular reflection is conducted depending on the flick. Thereby, weight or feeling of material is particularly enhanced.

For the second embodiment described with reference to FIG. 7, a position on the touch panel or the like is designated or an orientation of eyes is detected as the user operation information, and image control for specular reflection is conducted depending on the position or the orientation of eyes. Thereby, texture is particularly enhanced.

For the third embodiment described with reference to FIG. 8, a position on the touch panel or the like is designated or an orientation of eyes is detected as the user operation information, and image control for a change in geometry is conducted depending on the position or the orientation of eyes. Thereby, a feeling of touch is particularly enhanced.

For the fourth embodiment described with reference to FIG. 9, a tilt of the display displaying an image thereon is detected as the user operation information, and image control for at least one of specular reflection and change in geometry is conducted depending on the tilt. Thereby, texture or a feeling of touch is particularly enhanced.

For the fifth embodiment described with reference to FIG. 10, user's blinking is detected by the eyes detection unit as the user operation information, and image control for specular reflection is conducted depending on the number of blinking. Further, the visual environment and the like to be fed back are adjusted. Thereby, a natural feeling is enhanced. Further, lower power is also achieved.

For the sixth embodiment described with reference to FIG. 11, a viewing time of the user viewing the display is detected by the eyes detection unit or the like as the user operation information, and image control for specular reflectance is conducted depending on the viewing time. Further, the visual environment and the like to be fed back are adjusted. Thereby, a natural feeling is enhanced.

For the seventh embodiment described with reference to FIG. 12, a color or position of a light source is detected by light source estimation in an image, and the visual environment and the like are adjusted depending on the color or position. Thereby, texture is enhanced.

<4. Exemplary Processing>
[Exemplary Image Processing]

Figure 14:
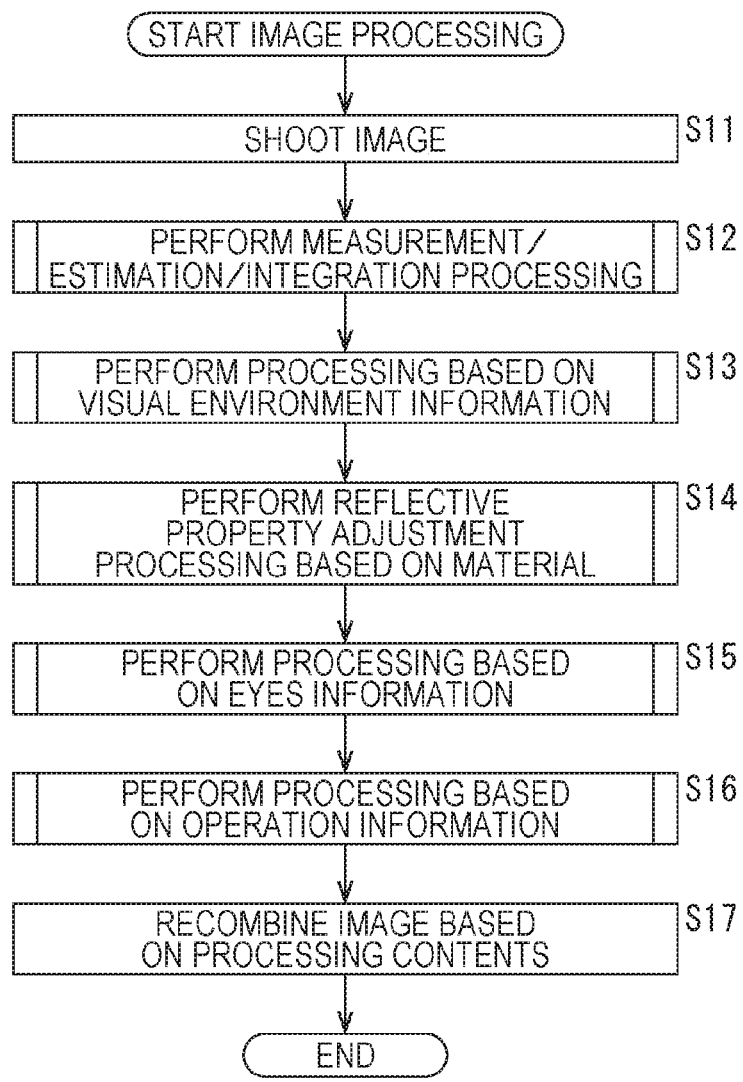
FIG. 14 is a flowchart for explaining the image processing of the image processing apparatus of FIG. 3.

The image processing of the image processing apparatus 11 in FIG. 3 will be described below with reference to the flowchart of FIG. 14.

In step S11, the shooting environment information acquisition unit 21 shoots an image of an object and inputs the image of the object. The shooting environment information acquisition unit 21 supplies the input image to the object property analysis unit 23 and the image combination unit 27.

In step S12, the shooting environment information acquisition unit 21, the shooting environment information analysis unit 22, and the object property analysis unit 23 perform the measurement/estimation/integration processing. The measurement/estimation/integration processing will be described below in detail with reference to FIG. 15. With the processing in step S12, the measured physical property parameters and the estimated physical property parameters (such as reflective property of object, shooting environment light, geometry of object, and material of object) are supplied to the property control unit 26.

In step S13, the visual environment information analysis unit 25 and the property control unit 26 perform the processing based on the visual environment information on an environment when the image is viewed. The processing based on the visual environment information will be described below in detail with reference to FIG. 16. With the processing in step S13, the processing contents of texture control based on the visual environment information are determined.

In step S14, the property control unit 26 performs the reflective property adjustment processing based on a material of the object. The reflective property adjustment processing will be described below with reference to FIG. 17. Note that, at this time, the physical property parameters (material and reflective property) integrated by the property information integration unit 24 will be referred to. With the processing in step S14, the processing contents of texture control based on the reflective property are determined.

In step S15, the operation environment information analysis unit 28 and the property control unit 26 perform the processing based on the eyes information included in the user operation information. The processing based on the eyes information will be described below with reference to FIG. 18. With the processing in step S15, the processing contents of texture control based on the eyes information are determined.

In step S16, the operation environment information analysis unit 28 and the property control unit 26 perform the processing based on the operation information included in the user operation information. The processing based on the operation information will be described below with reference to FIG. 18. With the processing in step S16, the processing contents of texture control based on the operation information are determined.

In step S17, the image combination unit 27 recombines the input image on the basis of the determined processing contents of texture control. That is, in the example of FIG. 14, the texture of the image of the object is controlled by contrast adjustment of the visual environment light, adjustment of the reflective property based on the material of the image, adjustment based on the eyes information, and adjustment based on the operation information.

As described above, all the physical property parameters acquired on the shooting or from the image are used. Further, if the physical property parameters are acquired with high accuracy, they are changed thereby to optimize the illumination light, to enhance glossiness, and to reproduce transparency in the image even when the input image is less reproducible. That is, a situation when the object is actually seen can be reproduced in video as computer graphics (CG).

As described above, according to the present technology, the physical property parameters (such as geometry, reflective property and lighting) of the object can be measured and controlled, thereby enhancing the video quality.

Further, texture can be reproduced depending on the user operation information (such as user operation or eyes information) as if the object is actually present. For example, the feelings other than appearance, such as feeling of touch, can be provided.

Figure 15:
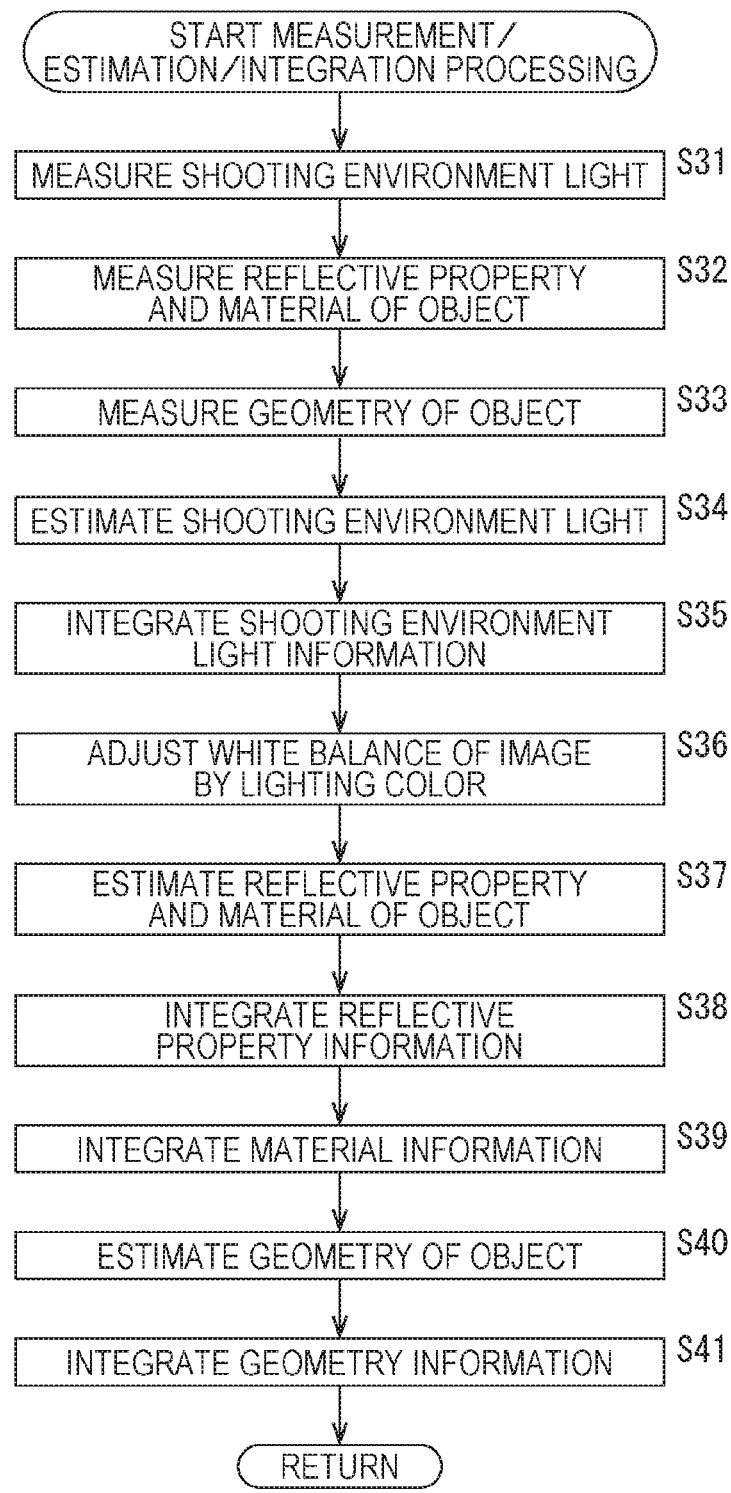
FIG. 15 is a flowchart for explaining the measurement/estimation/integration processing.

The measurement/estimation/integration processing in step S12 in FIG. 14 will be described below with reference to the flowchart of FIG. 15.

In step S31, the shooting environment information acquisition unit 21 measures a shooting environment light and supplies the measured shooting environment light to the shooting environment information analysis unit 22. The shooting environment information analysis unit 22 analyzes the shooting environment light from the shooting environment information acquisition unit 21, and supplies the information on the shooting environment light as a result of the analysis to the property information integration unit 24.

In step S32, the shooting environment information acquisition unit 21 measures the reflective property of the object, and supplies the measured reflective property of the object and the material thereof to the shooting environment information analysis unit 22. The shooting environment information analysis unit 22 analyzes the reflective property and the material of the object from the shooting environment information acquisition unit 21, and supplies the analyzed reflective property and material of the object to the property information integration unit 24.

In step S33, the shooting environment information acquisition unit 21 measures a geometry of the object, and supplies the measured geometry of the object to the shooting environment information analysis unit 22. The shooting environment information analysis unit 22 analyzes the geometry of the object from the shooting environment information acquisition unit 21, and supplies the analyzed geometry of the object to the property information integration unit 24.

In step S34, the object property analysis unit 23 estimates and analyzes the shooting environment light based on the supplied input image, and acquires the information on the shooting environment light as a result of the analysis. The object property analysis unit 23 supplies the information on the shooting environment light to the property information integration unit 24.

In step S35, the property information integration unit 24 integrates the information on the measured shooting environment light and the information on the estimated shooting environment light. The property information integration unit 24 supplies the integrated information on the shooting environment light as the physical property parameters to the property control unit 26.

In step S36, the property control unit 26 causes the image combination unit 27 to adjust white balance of the image by the lighting color acquired from the information on the shooting environment light.

In step S37, the object property analysis unit 23 estimates and analyzes the reflective property and the material of the object, and supplies the information on the analyzed reflective property and material to the property information integration unit 24.

In step S38, the property information integration unit 24 integrates the information on the measured reflective property of the object and the information on the estimated reflective property of the object. The property information integration unit 24 supplies the integrated information on the reflective property of the object as the physical property parameters to the property control unit 26.

In step S39, the property information integration unit 24 integrates the information on the measured material of the object and the information on the estimated material of the object. The property information integration unit 24 supplies the integrated information on the material of the object as the physical property parameters to the property control unit 26.

In step S40, the object property analysis unit 23 estimates and analyzes a geometry of the object, and supplies the information on the analyzed geometry of the object to the property information integration unit 24.

In step S41, a property information integration unit 311 integrates the information on the measured geometry of the object and the information on the estimated geometry of the object. The property information integration unit 311 supplies the integrated information on the geometry of the object as the physical property parameters to a property control unit 312.

As described above, the material and the like of the object are further measured in addition to the property of the object on the shooting such as the illumination light, the reflective property of the object, and the geometry thereof, and they are estimated on the basis of the input image and integrated on the basis of reliability. The thus-integrated physical property parameters are used for texture control, thereby optimizing the illumination light, enhancing glossiness, and further enhancing reproducibility of transparency in the image.

Figure 16:
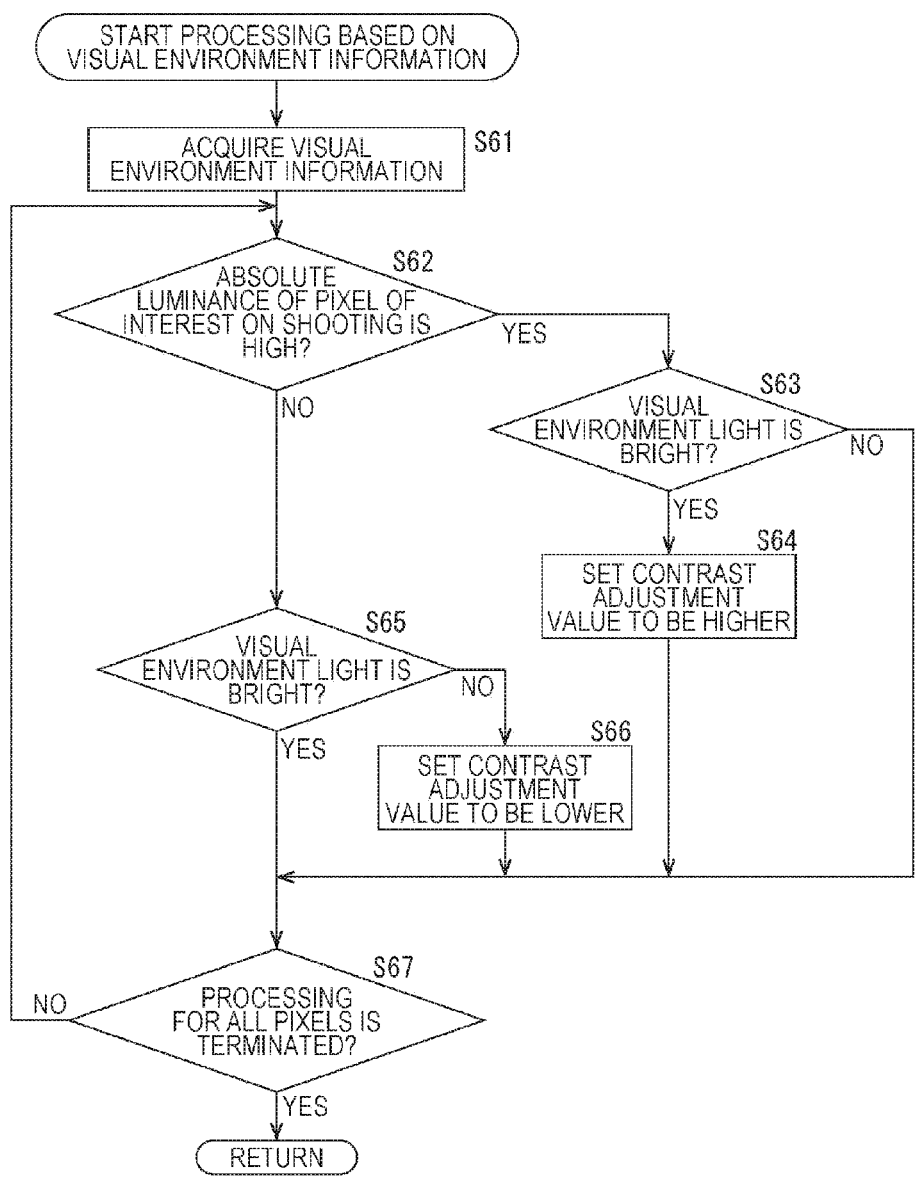
FIG. 16 is a flowchart for explaining the processing based on visual environment information.

The processing based on the visual environment information in step S13 in FIG. 14 will be described below with reference to the flowchart of FIG. 16.

In step S61, the visual environment information analysis unit 25 acquires and analyzes the information on the visual environment light, for example, as the information on the visual environment while the image is being viewed. The visual environment information analysis unit 25 supplies the information on the analyzed visual environment light as the visual environment parameters to the property control unit 26.

The property control unit 26 is supplied with the estimated information on absolute luminance of the image on the shooting from the object property analysis unit 23. In step S62, the property control unit 26 determines whether the absolute luminance of a pixel of interest on the shooting is higher than a predetermined luminance value. In step S62, when it is determined that the absolute luminance of the pixel of interest on the shooting is higher, the processing proceeds to step S63.

In step S63, the property control unit 26 determines whether the visual environment light is brighter than a predetermined value with reference to the visual environment parameters from the visual environment information analysis unit 25. In step S63, when it is determined that the visual environment light is brighter, the processing proceeds to step S64. In this case, the visual environment light may be dark, and thus in step S64, a property control unit 111 controls the image combination unit 27 and causes it to set a contrast adjustment value to be higher for texture control.

In step S63, when it is determined that the visual environment light is dark, step S64 is skipped and the processing proceeds to step S67.

In step S62, when it is determined that the absolute luminance of the pixel of interest on the shooting is low, the processing proceeds to step S65. In step S65, the property control unit 26 determines whether the visual environment light is brighter than a predetermined value with reference to the visual environment parameters from the visual environment information analysis unit 25.

In step S65, when it is determined that the visual environment light is dark, the processing proceeds to step S66. In step S66, the property control unit 26 controls the image combination unit 27 and causes it to set the contrast adjustment value to be lower for texture control.

In step S65, when it is determined that the visual environment light is bright, step S66 is skipped and the processing proceeds to step S67.

In step S67, the property control unit 26 determines whether the adjustment of reflective property for all the pixels is terminated.

In step S67, when it is determined that the processing for all the pixels is terminated, the processing based on the visual environment information ends. In step S67, when it is determined that the processing for all the pixels is not terminated, the processing returns to step S62 and a series of processing in step S62 and subsequent steps is repeatedly performed.

As described above, the contrast adjustment by visual environment and the adjustment of reflective property of the image are made, thereby controlling texture of the image of the object. Thereby, optimization of the illumination light, enhancement in glossiness, and reproduction of transparency are achieved in the image.

Figure 17:
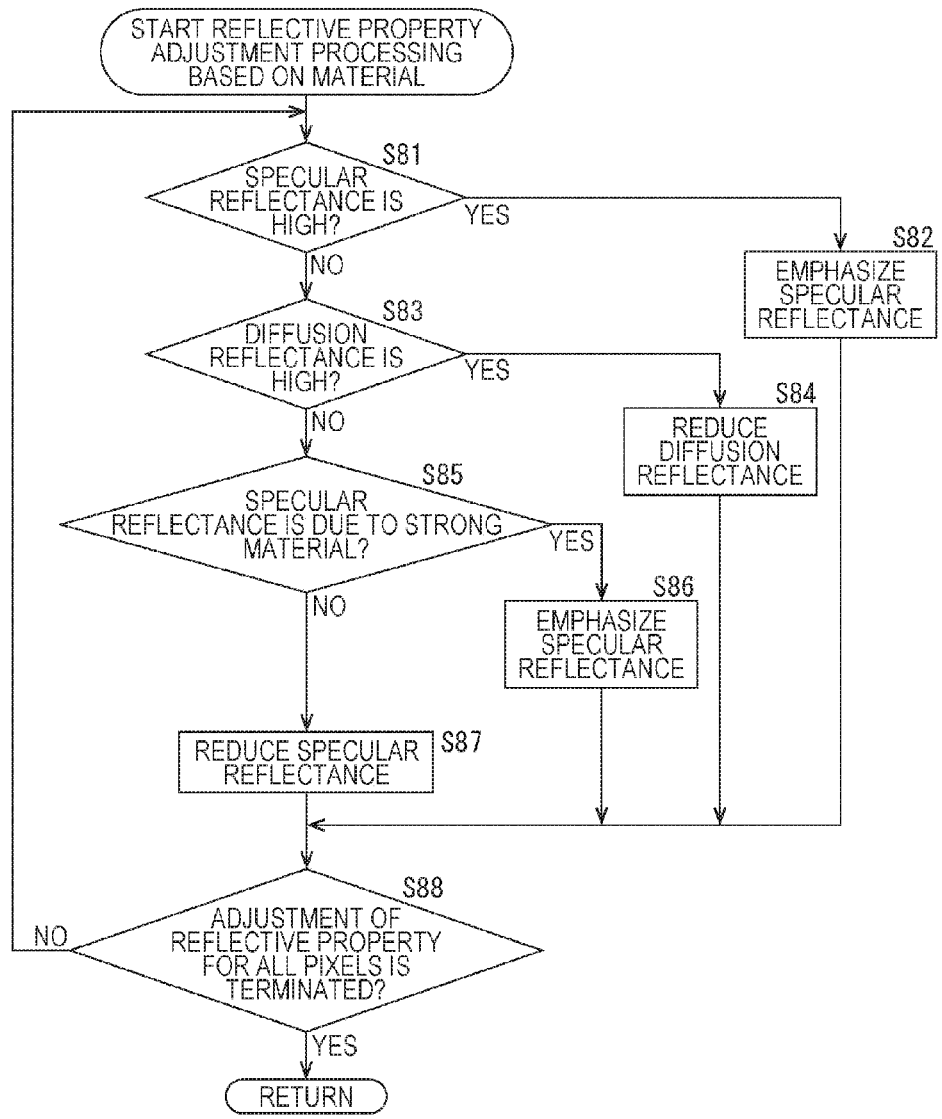
FIG. 17 is a flowchart for explaining a reflective property adjustment processing based on material.

The reflective property adjustment processing based on material in step S14 in FIG. 14 will be described below with reference to the flowchart of FIG. 17.

In step S81, the property control unit 26 determines whether the specular reflectance is high on the basis of the information on the reflective property of the object from the property information integration unit 24. In step S81, when it is determined that the specular reflectance is high, the processing proceeds to step S82.

In step S82, the property control unit 26 determines to emphasize the specular reflectance for texture control. In step S81, when it is determined that the specular reflectance is low, the processing proceeds to step S83.

In step S83, the property control unit 26 determines whether the diffusion reflectance is high. In step S83, when it is determined that the diffusion reflectance is high, the processing proceeds to step S84. In step S84, the property control unit 26 determines to reduce the diffusion reflectance for texture control.

In step S83, when it is determined that the diffusion reflectance is low, the processing proceeds to step S85.

In step S85, the property control unit 26 determines whether the specular reflection is due to strong material on the basis of the information on the material of the object integrated by the property information integration unit 24. In step S85, when it is determined that the specular reflection is due to strong material, the processing proceeds to step S86. In step S86, the property control unit 26 determines to emphasize the specular reflectance for texture control.

In step S85, when it is determined that the specular reflection is not due to strong material, the processing proceeds to step S87. In step S87, the property control unit 26 determines to reduce the specular reflectance for texture control.

In step S88, the property control unit 26 determines whether the adjustment of reflective property for all the pixels is terminated.

In step S88, when it is determined that the adjustment of reflective property for all the pixels is terminated, the reflective property adjustment processing ends. In step S88, when it is determined that the adjustment of reflective property for all the pixels is not terminated, the processing returns to step S81 and a series of processing in step S81 and subsequent steps is repeatedly performed.

As described above, the adjustment of reflective property of the image is made depending on the material of the object, thereby controlling texture of the image of the object. Thereby, optimization of the illumination light, enhancement in glossiness, and reproduction of transparency are achieved in the image.

Figure 18:
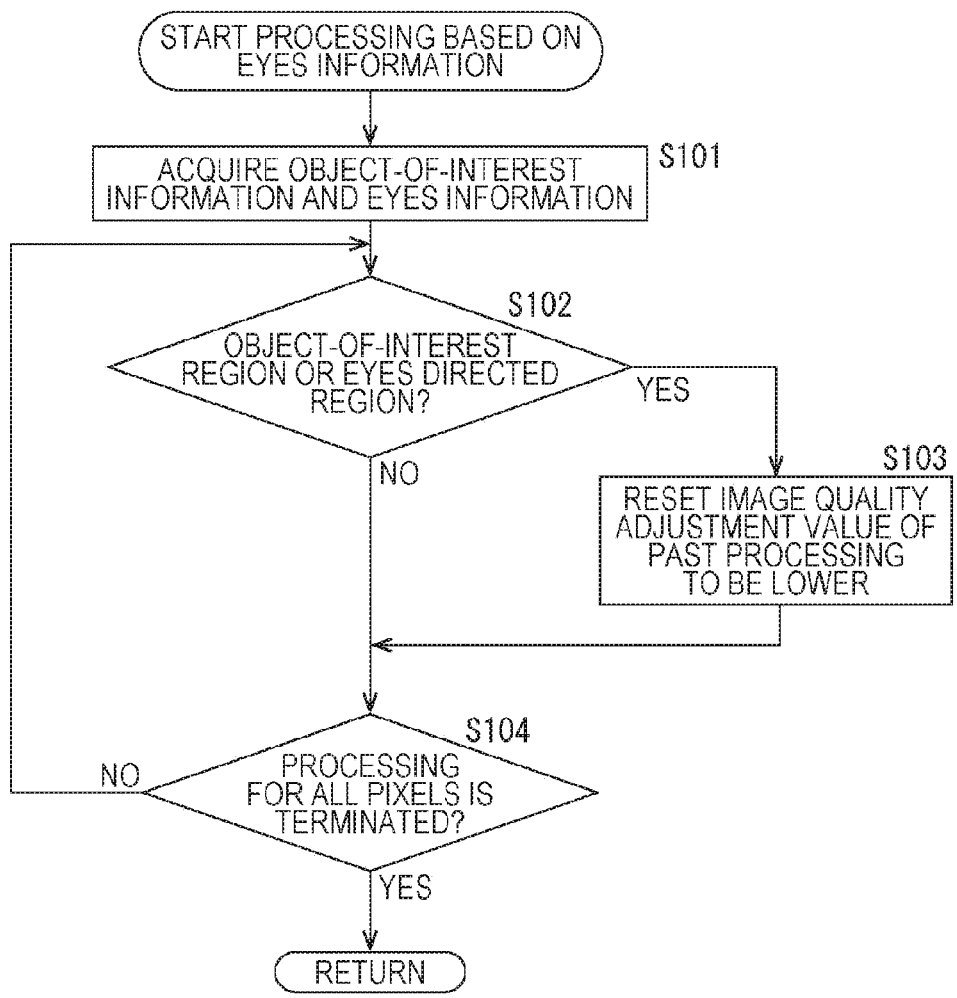
FIG. 18 is a flowchart for explaining the processing based on eyes information.

The processing based on the eyes information in step S15 in FIG. 14 will be described below with reference to the flowchart of FIG. 18.

In step S101, the operation environment information analysis unit 28 acquires and analyzes the operation environment information such as object-of-interest information or eyes information. The operation environment information analysis unit 28 supplies the analyzed operation environment information as the operation environment parameters to the property control unit 26.

In step S102, the property control unit 26 determines whether a pixel of interest is in an object-of-interest region or an eyes-directed region. In step S102, when it is determined that the pixel of interest is in the object-of-interest region or the eyes-directed region, the processing proceeds to step S103.

In step S103, the property control unit 26 controls the image combination unit 27 and causes it to reset the image quality adjustment value of the past processing (or the processing based on visual environment information and material) to be lower for texture control.

In step S102, when it is determined that the pixel of interest is in neither the object-of-interest region nor the eyes-directed region, step S103 is skipped and the processing proceeds to step S104.

In step S104, the property control unit 26 determines whether the processing for all the pixels is terminated.

In step S104, when it is determined that the processing for all the pixels is terminated, the processing based on the eyes information ends. In step S104, when it is determined that the processing for all the pixels is not terminated, the processing returns to step S102 and a series of processing in step S102 and subsequent steps is repeatedly performed.

As described above, the contrast adjustment by visual environment and the adjustment of reflective property of the image are made, thereby controlling texture of the image of the object. Thereby, optimization of the illumination light, enhancement in glossiness, and reproduction of transparency are achieved in the image.

Figure 19:
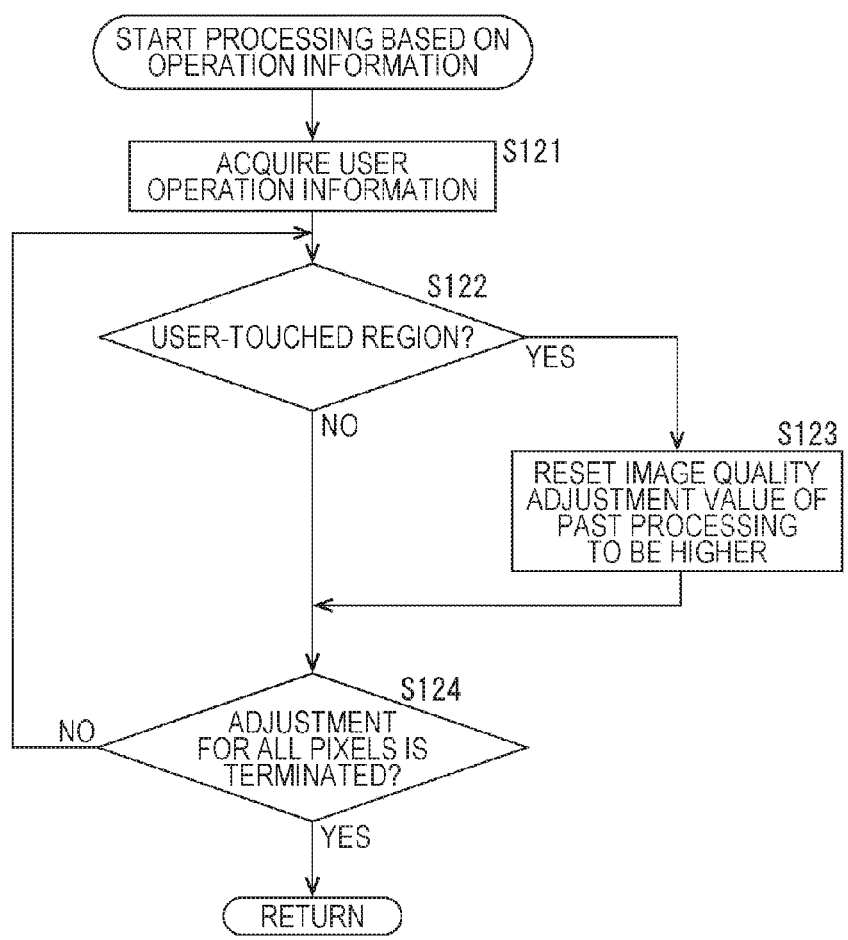
FIG. 19 is a flowchart for explaining the processing based on operation information.

The processing based on the operation information in step S16 in FIG. 14 will be described below with reference to the flowchart of FIG. 19.

In step S121, the operation environment information analysis unit 28 acquires and analyzes the operation environment information such as the user operation information (such as flick). The operation environment information analysis unit 28 supplies the analyzed operation environment information as the operation environment parameters to the property control unit 26.

In step S122, the property control unit 26 determines whether a pixel of interest is in a user-touched region. In step S122, when it is determined that the pixel of interest is in the user-touched region, the processing proceeds to step S123.

In step S123, the property control unit 26 controls the image combination unit 27 and causes it to reset the image quality adjustment value of the past processing (or the processing based on visual environment information, reflective property and eyes information) to be lower for texture control.

In step S122, when it is determined that the pixel of interest is not in the user-touched region, step S123 is skipped and the processing proceeds to step S124.

In step S124, the property control unit 26 determines whether the processing for all the pixels is terminated.

In step S124, when it is determined that the processing for all the pixels is terminated, the processing based on the eyes information ends. In step S124, when it is determined that the processing for all the pixels is not terminated, the processing returns to step S122 and a series of processing in step S122 and subsequent steps is repeatedly performed.

As described above, the reflective property of the image is adjusted depending on the user operation information in the operation environment. Thereby, optimization of the illumination light, enhancement in glossiness, and reproduction of transparency are further achieved in the image. That is, texture can be reproduced as if the object is actually present.

Further, as described above, the above control is conducted depending on user's operation and interaction with the display device, thereby providing higher-level feelings other than appearance, such as feeling of touch of the object.

The feelings are emphasized, thereby expressing more realistic feelings even during display on a small screen.

Note that the processing can be performed also by determining whether the pixel of interest is in a user's eyes region as eyes information instead of the operation information. That is, the processing can be performed only in a region of interest by eyes detection or a region designated by touch position, thereby partially emphasizing the specular reflectance. To the contrary, if the user feels that the image is too bright, the specular reflectance can be restricted not to be bright.

Further, the specular reflectance can be gradually restricted in a long viewing time, thereby realizing lower power consumption.

[Other Exemplary Image Processing]

Figure 20:
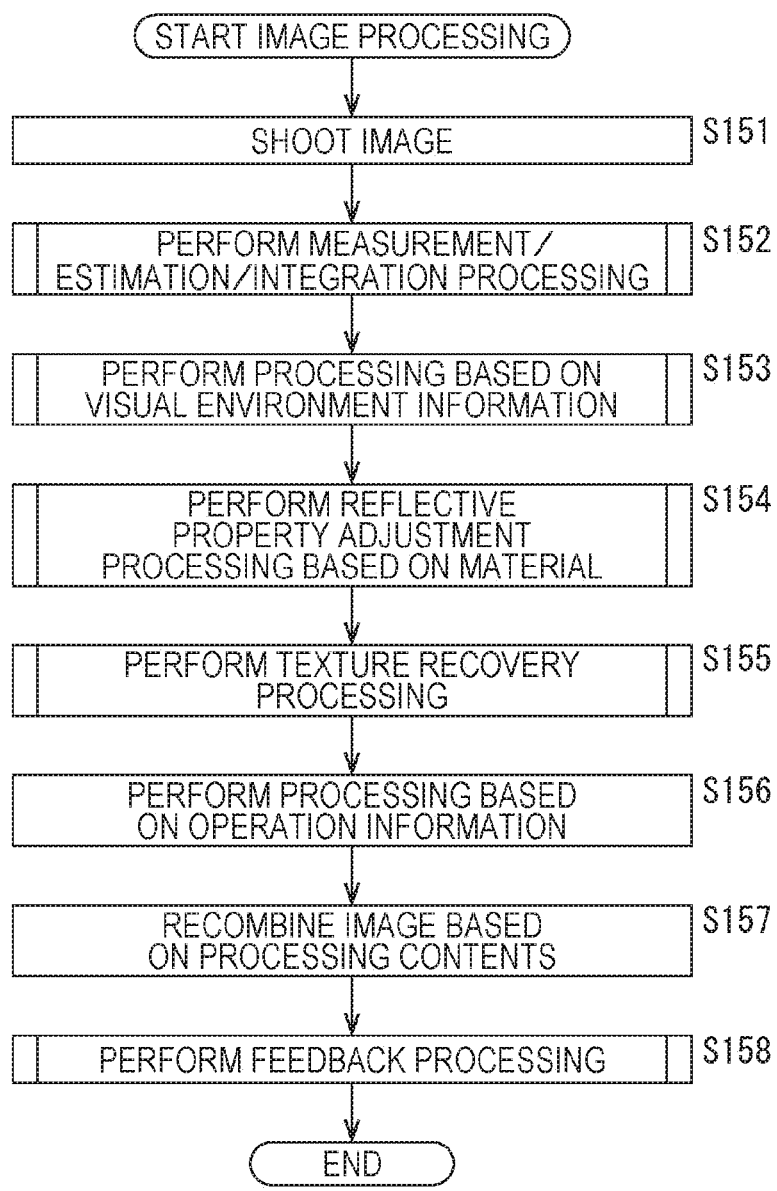
FIG. 20 is a flowchart for explaining the image processing of the image processing apparatus of FIG. 4.

The image processing of the image processing apparatus 51 in FIG. 4 will be described below with reference to the flowchart of FIG. 20. Note that FIG. 20 illustrates how the feedback processing is performed.

In step S151, the shooting environment information acquisition unit 21 shoots an image of an object and inputs the image of the object. The shooting environment information acquisition unit 21 supplies the input image to the object property analysis unit 23 and the image combination unit 27.

In step S152, the shooting environment information acquisition unit 21, the shooting environment information analysis unit 22, and the object property analysis unit 23 perform the measurement/estimation/integration processing. The measurement/estimation/integration processing are basically similar to the processing described with reference to FIG. 15, and the repeated description thereof will be omitted. With the processing in step S152, the measured physical property parameters and the estimated physical property parameters (such as reflective property of the object, shooting environment light, geometry of the object, and material of the object) are supplied to the property control unit 26.

In step S153, the visual environment information analysis unit 25 and the property control unit 26 perform the processing based on the visual environment information while an image is being viewed. The processing based on the visual environment information are basically similar to the processing described with reference to FIG. 16, and the repeated description thereof will be omitted. With the processing in step S153, the processing contents of texture control based on the visual environment information are determined.

In step S154, the property control unit 26 performs the reflective property adjustment processing based on the material of the object. The reflective property adjustment processing is basically similar to the processing described above with reference to FIG. 17, and the repeated description thereof will be omitted. Note that, at this time, the physical property parameters (material and reflective property) integrated by the property information integration unit 24 is referred to. With the processing in step S154, the processing contents of texture control based on the reflective property are determined.

In step S155, the property control unit 26 causes the property information integration unit 24 to read a texture image depending on the material, and uses it to perform the texture recovery processing depending on the kind of the material of the input image. The texture recovery processing will be described below with reference to FIG. 21. With the processing in step S155, the processing contents of texture control by the texture recovery are determined. Note that the processing is one of the series of processing performed with reference to the previous knowledge database 61, which is the processing performed with reference to the previous knowledge database 61 described with reference to FIG. 6 or FIG. 8.

In step S156, the operation environment information analysis unit 28 and the property control unit 26 perform the processing based on the operation information included in the user operation information. The processing based on the operation information are basically similar to the processing described with reference to FIG. 18, and the repeated description thereof will be omitted. With the processing in step S156, the processing contents of texture control based on the operation information are determined.

In step S157, the image combination unit 27 recombines the input image on the basis of the determined processing contents of texture control. That is, in the example of FIG. 20, texture of the image of the object is controlled by contrast adjustment of the measured visual environment light, adjustment of the reflective property based on the material of the image, texture recovery depending on the material, and the processing based on the operation information. At this time, the processing contents of the texture control are supplied from the property control unit 26 to the additional information generation unit 62.

In step S158, the additional information generation unit 62 performs the feedback processing on the visual environment or the operation environment. The feedback processing will be described below with reference to FIG. 22. With the processing in step S158, the feedback to the visual environment or the operation environment is performed on the basis of the contents of the texture control of the image of the object. Thereby, an increase in reproducibility of image quality can be achieved or lower power can be achieved.

Figure 21:
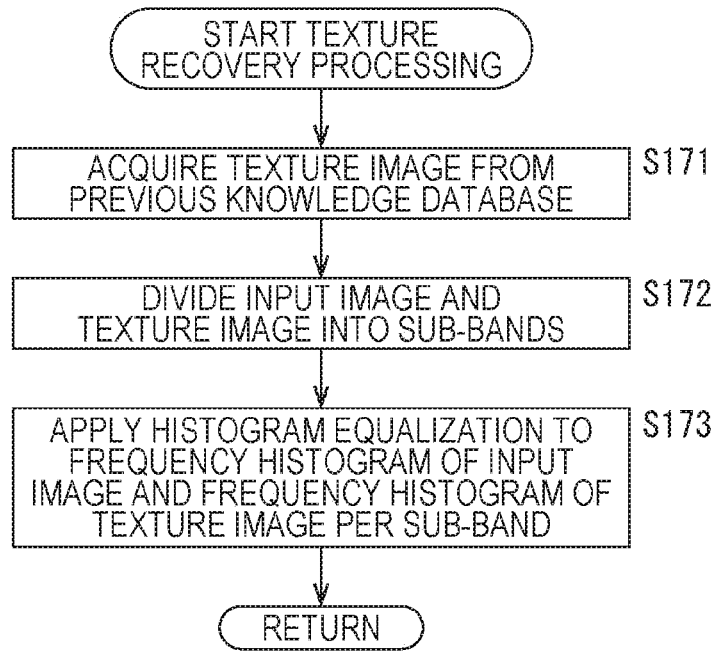
FIG. 21 is a flowchart for explaining a texture recovery processing.

The texture recovery processing in step S155 in FIG. 20 will be described below with reference to the flowchart of FIG. 21.

In step S171, the property control unit 26 controls the property information integration unit 24 and causes it to acquire a texture image (patch data) corresponding to the material of the object from the previous knowledge database 61.

In step S172, the property control unit 26 controls the image combination unit 27 to divide the input image and the texture image in sub-bands by use of a filter bank.

In step S173, the property control unit 26 controls the image combination unit 27 to make adjustment per sub-band such that the histogram of the frequency component of the input image matches with the histogram of the frequency component of the texture image. That is, the property control unit 26 controls the image combination unit 27 and causes it to perform histogram equalization on the input image and the texture image per sub-band.

As described above, the texture control of recovering texture is conducted so that the texture of the object is enhanced, which causes a more realistic image.

Figure 22:
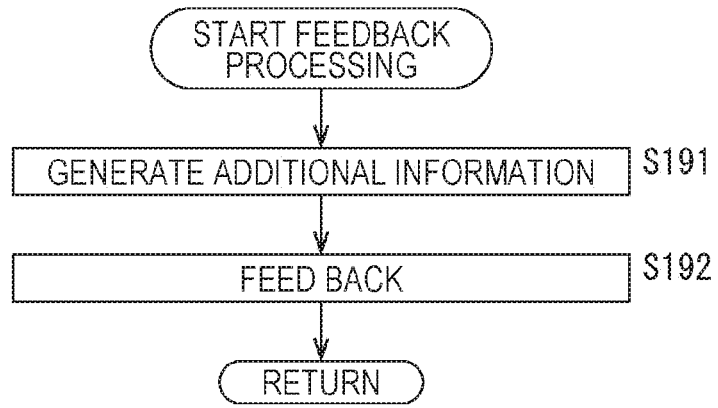
FIG. 22 is a flowchart for explaining a feedback processing.

The feedback processing in step S158 in FIG. 20 will be described below with reference to the flowchart of FIG. 22.

In step S191, the additional information generation unit 62 generates additional information to be fed back to the visual environment or the operation environment based on the processing contents of texture control from the property control unit 26.

In step S192, the additional information generation unit 62 provides (feeds back) the generated additional information to the lighting instrument configuring the visual environment, the detection unit for detecting the eyes information, the operation unit, the GUI, or the sensor, which configure the operation environment.

As described above, the above control is conducted depending on user's operation or interaction with the display device, thereby providing higher-level feelings other than appearance, such as feeling of touch of the object. Further, the feedback to the visual environment or the operation environment is performed, thereby emphasizing the past effects.

User's preference can be reflected depending on his/her viewing information.

The illumination light can be optimized in the image for the visual environment (environment light or display device).

Further, for example, as described above with reference to FIG. 6 or FIG. 8, force feedback can be performed for the operation environment (interaction from the user), thereby expressing weight or asperity of the object.

As described above, all the physical property parameters acquired on the shooting or from the image can be used. Further, if the physical property parameters are acquired with high accuracy, they are changed thereby to optimize the illumination light, to enhance glossiness, and to reproduce transparency in the image even when the input image is less reproducible. That is, a situation when the object is actually seen can be reproduced in video as computer graphics (CG).

As described above, according to the present technology, texture can be more realistically reproduced as if an object is actually present. In particular, the image quality or the display method is changed depending on the operation environment (interaction from the user), thereby giving feelings other than appearance, such as feeling of touch of the object.

Further, user's preference can be reflected depending on his/her viewing information.

<5. Exemplary Structure of Computer>
[Personal Computer]

A series of processing described above can be performed in hardware, or performed in software. When the series of processing are performed in software, a program configuring the software is installed in a computer. Herein, the computer may be a computer incorporating dedicated hardware therein, or a general-purpose personal computer capable of performing various functions by installing various programs.

Figure 23:
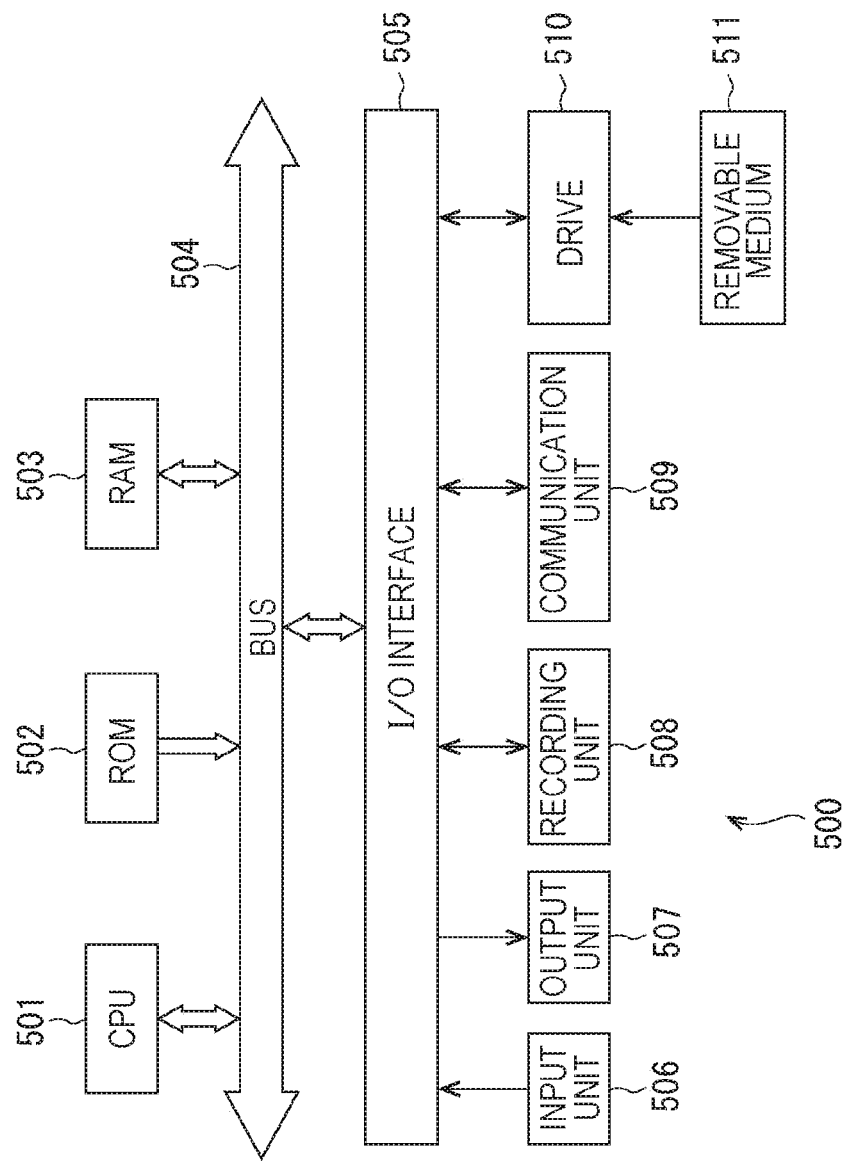
FIG. 23 is a block diagram illustrating an exemplary main structure of a personal computer.

FIG. 23 is a block diagram illustrating an exemplary hardware structure of a personal computer performing the series of processing by a program.

In a personal computer 500, a central processing unit (CPU) 501, a read only memory (ROM) 502, and a random access memory (RAM) 503 are connected to each other via a bus 504.

The bus 504 is further connected with an I/O interface 505. The I/O interface 505 is further connected with an input unit 506, an output unit 507, a storage unit 508, a communication unit 509, and a drive 510.

The input unit 506 is configured of keyboard, mouse, microphone or the like. The output unit 507 is configured of display, speaker, or the like. The storage unit 508 is configured of hard disk drive, nonvolatile memory, or the like. The communication unit 509 is configured of network interface or the like. The drive 510 drives a removable medium 511 such as magnetic disk, optical disc, magnetooptical disk, or semiconductor memory.

In the personal computer 500 configured as described above, the CPU 501 loads and executes a programs stored in the storage unit 508 into the RAM 503 via the I/O interface 505 and the bus 504, for example. Thereby, the series of processing are performed.

The program executed by the computer (the CPU 501) can be recorded and provided in the removable medium 511. The removable medium 511 is a package medium such as magnetic disk (including flexible disk), optical disc (such as compact disc-read only memory (CD-ROM) or digital versatile disc (DVD)), magnetooptical disk, or semiconductor memory. Further, alternatively, the program can be provided via wired or wireless transmission medium such as local area network, the Internet, or digital satellite broadcasting.

In the computer, the removable medium 511 is mounted on the drive 510 so that the program can be installed in the storage unit 508 via the I/O interface 505. Further, the program can be received in the communication unit 509 and installed in the storage unit 508 via a wired or wireless transmission medium. Additionally, the program can be previously installed in the ROM 502 or the storage unit 508.

Note that the program executed by the computer may be a program by which the series of processing is performed in time series in the order described in the present specification, or a program by which the series of processing is performed in parallel or as needed such as when calling is made.

Further, in the present specification, the steps for describing the program to be recorded in a recording medium are assumed to include the series of processing performed in time series in the described order or the series of processing performed in parallel or independently even if not necessarily processed in time series.

Further, in the present specification, a system indicates an entire apparatus configured of a plurality of devices.

Further, the structure described above as one apparatus (or processing unit) may be divided to be configured as a plurality of devices (or processing units). To the contrary, the structures described above as a plurality of devices (or processing units) can be configured into one apparatus (or processing unit). Further, structures other than the above structures may be added to the structure of each apparatus (or each processing unit). Further, if the structure or operations as an entire system are substantially the same, part of the structure of an apparatus (or processing unit) may be included in the structure of other apparatus (or other processing unit). That is, the present technology is not limited to the embodiments described above, and can be variously changed without departing from the scope of the present technology.

The preferred embodiments of the present disclosure have been described above in detail with reference to the accompanying drawings, but the present disclosure is not limited to the examples. It is clear that various modifications or corrections can be made by those skilled in the art in the technical field to which the present disclosure belongs within the technical spirit described in Claims, and fall within the technical scope of the present disclosure.

Note that the present technology may employ the following structures.

(1) An image processing apparatus including:
a user operation information acquisition unit for acquiring user operation information on user's operations performed while an image is being displayed; and
a texture control unit for controlling texture of an object in the image depending on the user operation information acquired by the user operation information acquisition unit.

(2) The image processing apparatus according to (1),
wherein the user operation information is user's operation information input for a displayed image.

(3) The image processing apparatus according to (1) or (2),
wherein the user operation information is user's eyes information for a displayed image.

(4) The image processing apparatus according to any of (1) to (3),
wherein the user operation information is tilt information when the user moves a display displaying the image thereon.

(5) The image processing apparatus according to any of (1) to (4),
wherein the user operation information is viewing information on viewing of the user viewing a displayed image.

(6) The image processing apparatus according to any of (1) to (5),
wherein the texture control unit adjusts intensity of a reflective property of the object in the image.

(7) The image processing apparatus according to any of (1) to (6),
wherein the texture control unit changes a viewpoint position of the object in the image.

(8) The image processing apparatus according to any of (1) to (7),
wherein the texture control unit changes a geometry of the object in the image.

(9) The image processing apparatus according to any of (1) to (8), further including:
an additional information generation unit for generating additional information for adjusting a viewing environment in which a displayed image is viewed depending on control contents of the texture control unit.

(10) The image processing apparatus according to any of (1) to (9),
wherein the additional information is directed for adjusting a viewing environment light.

(11) The image processing apparatus according to any of (1) to (10), further including:
a physical property parameter acquisition unit for acquiring physical property parameters of an object in an image,
wherein the texture control unit controls texture of the object in the image depending on the physical property parameters acquired by the physical property parameter acquisition unit.

(12) The image processing apparatus according to any of (1) to (11),
wherein the physical property parameters are reflective property information on a reflective property of the object.

(13) The image processing apparatus according to any of (1) to (12),
wherein the physical property parameters are information on materials of the object.

(14) The image processing apparatus according to any of (1) to (13),
wherein the physical property parameters are information on a geometry of the object.

(15) The image processing apparatus according to any of (1) to (14),
wherein the physical property parameters are information on lighting of the object.

(16) An image processing method in which an image processing apparatus acquires user operation information on user's operations performed while an image is being displayed, and
controls texture of an object in the image depending on the acquired user operation information.

REFERENCE SIGNS LIST

1: Measurement/estimation block
2: Real-world modeling block
3: Texture control block
4: Rendering/retouching block
11: Image processing apparatus
21: Shooting environment information acquisition unit
22: Shooting environment information analysis unit
23: Object property analysis unit
24: Property information integration unit
25: Visual environment information analysis unit
26: Property control unit
27: Image combination unit
28: Operation environment information interpretation unit
51: Image processing apparatus
61: Previous knowledge database
62: Additional information generation unit

The invention claimed is:

1. An image processing apparatus, comprising:
one or more processors configured to:
acquire user operation information based on a user's operation with respect to an image displayed on a display device;
acquire lighting information of an environment in which the image is displayed;
adjust intensity of a reflective property of an object in the displayed image; and
control a texture of the object in the displayed image based on the acquired user operation information, the acquired lighting information, and the adjusted intensity.

2. The image processing apparatus according to claim 1, wherein the user operation information is user's operation information input for the displayed image.

3. The image processing apparatus according to claim 1, wherein the user operation information is user's eyes information for the displayed image.

4. The image processing apparatus according to claim 1, wherein the user operation information is tilt information based on user's movement of the display device that displays the image.

5. The image processing apparatus according to claim 1, wherein the user operation information is viewing information based on user's viewing of the displayed image.

6. The image processing apparatus according to claim 1, wherein the one or more processors are further configured to change a viewpoint position of the object in the displayed image.

7. The image processing apparatus according to claim 1, wherein the one or more processors are further configured to change a geometry of the object in the displayed image.

8. The image processing apparatus according to claim 1, wherein the one or more processors are further configured to:
generate additional information; and
adjust, based on the additional information, a viewing environment,
wherein the displayed image is viewed based on control contents associated with the texture.

9. The image processing apparatus according to claim 8, wherein the one or more processors are further configured to adjust a viewing environment light based on the additional information.

10. The image processing apparatus according to claim 1, wherein the one or more processors are further configured to:
acquire physical property parameters of the object in the displayed image, and
control texture of the object in the displayed image based on the acquired physical property parameters.

11. The image processing apparatus according to claim 10, wherein the physical property parameters are reflective property information on the reflective property of the object.

12. The image processing apparatus according to claim 10, wherein the physical property parameters are information on materials of the object.

13. The image processing apparatus according to claim 10, wherein the physical property parameters are information on a geometry of the object.

14. The image processing apparatus according to claim 10, wherein the physical property parameters are information on lighting of the object.

15. An image processing method, comprising:
acquiring user operation information based on a user's operation with respect to an image displayed on a display device;
acquiring lighting information of an environment in which the image is displayed;
adjusting intensity of a reflective property of an object in the displayed image; and
controlling a texture of the object in the displayed image based on the acquired user operation information, the acquired lighting information, and the adjusted intensity.

* * * * *